(12) United States Patent
Fujii et al.

(10) Patent No.: US 7,049,023 B2
(45) Date of Patent: May 23, 2006

(54) FUEL CELL SEPARATOR HAVING A CHANNEL FORMED USING A SEALING MEMBER

(75) Inventors: Yosuke Fujii, Wako (JP); Takayuki Ogawa, Wako (JP); Hideaki Kikuchi, Wako (JP); Masaharu Suzuki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/982,587

(22) Filed: Oct. 17, 2001

(65) Prior Publication Data

US 2002/0045084 A1 Apr. 18, 2002

(30) Foreign Application Priority Data

Oct. 17, 2000 (JP) .......................... P2000-316658

(51) Int. Cl.
*H01M 8/04* (2006.01)
(52) U.S. Cl. ........................... 429/39; 429/35; 429/36; 429/38
(58) Field of Classification Search ............ 429/30–32, 429/35–36, 38, 39
See application file for complete search history.

(56) References Cited

U.S. PATENT DOCUMENTS 5,789,094 A * 8/1998 Kusunoki et al. ............. 429/39

FOREIGN PATENT DOCUMENTS

| GB | 2326017 | * 12/1998 |
| JP | 08-171926 | 7/1996 |
| JP | 2000-021418 | * 1/2000 |

* cited by examiner

*Primary Examiner*—Mark Ruthkosky
(74) *Attorney, Agent, or Firm*—Lahive & Cockfield, LLP; Anthony A. Laurentano, Esq.

(57) ABSTRACT

A fuel cell is provided wherein the production of a separator is easy and a reactant gas channel thereof can be easily arranged. The fuel cell is constituted by clamping an electrolyte membrane electrode assembly provided with an anode and a cathode at opposite positions on both sides of an electrolyte membrane, by a pair of separators via a sealing member. A part of a reactant gas channel formed between the electrolyte membrane electrode assembly and the cathode side separator is formed seamlessly by extended portions of the sealing member.

15 Claims, 9 Drawing Sheets

US 7,049,023 B2

FUEL CELL SEPARATOR HAVING A CHANNEL FORMED USING A SEALING MEMBER

BACKGROUND OF THE INVENTION

1. Field of the Invention

The present invention relates to a fuel cell. More specifically, the present invention relates to a fuel cell in which a reactant gas channel can be formed by effectively utilizing a sealing member.

2. Description of the Related Art

There has been developed a solid polymer electrolyte type fuel cell which, for instance, constituted by laminating a plurality of units, with one unit being such that a membrane electrode assembly (MEA) provided with an anode and a cathode at opposite positions with a solid polymer electrolyte membrane inserted therebetween is clamped by separators, and this has been utilized for various practical applications.

In this type of fuel cell, a fuel gas, for example a hydrogen gas, supplied to the anode side is turned into hydrogen ions on a catalytic electrode, and moves to the cathode via the appropriately humidified solid polymer electrolyte membrane. Electrons generated during this electrochemical reaction are taken out to an external circuit, and are used as direct-current electric energy. Since an oxidant gas, for example, an oxygen containing gas or air is supplied to the cathode, the hydrogen ions, the electrons and the oxidant gas react with each other at the cathode, to thereby generate water.

Here, a sealing member is intervened between the membrane electrode assembly and the separators provided at opposite positions on both thereof to ensure airtightness, so that the fuel gas and the oxidant gas supplied to the anode and the cathode do not leak outside, and a reactant gas channel for guiding the fuel gas and the oxidant gas is provided on the surface of the separator, in a portion surrounded by the sealing member (see Japanese Unexamined Patent Application, First Publication No. Hei 8-171926).

The separators of the fuel cell are required to have high conductivity and gastightness with respect to the fuel gas, and hence in many cases, the separators are molded with carbon type materials. However, in order to form the above described reactant gas channel in the carbon type material, there is a problem in that machining such as milling which takes time and energy becomes necessary. In order to deal with such a problem, separators made of a metal material have recently been adopted, as shown for example in Japanese Unexamined Patent Application, First Publication No. 2000-21418.

This will be described with reference to FIG. 19. In FIG. 19, reference symbol I denotes a separator (anode side separator) made of stainless steel which is formed by press forming. On the upper and lower parts of the left side edge and the right side edge of the separator 1, there are formed communicating holes 2 and 3. The communicating holes 2 and 3 are allocated for the inlet side and the outlet side of the fuel gas and the oxidant gas, respectively, and a plurality of separators are laminated with the electrolyte membrane electrode assembly clamped between the anode side separator and the other separator (a cathode side separator) (not shown), and an internal manifold is formed penetrating these separators. Moreover, a communicating hole 4 for cooling water is provided between respective communicating holes 2 and 3, so that the cooling water flows in the space between the anode side separator and the adjacent separator arranged on the backside thereof to thereby cool the fuel cell.

On the surface of the separator 1, there are formed a plurality of linear protruding members 5 by applying a corrugating process by press forming. These protruding members 5 are for supplying the fuel gas to grooves formed between adjacent protruding members, and guide the fuel gas supplied from the communicating hole 2 on the inlet side to the communicating hole 2 on the outlet side at diagonally opposite positions, so that the reaction with the oxidant gas (not shown) is performed uniformly.

At positions surrounding the communicating holes 2 and the protruding members, there is provided a gasket portion 6 made of resin or rubber, and this gasket portion 6 seals between the anode side separator and the membrane electrode assembly (not shown in the figure) to thereby ensure the airtightness with the outside, The gasket portion 6 is provided with connecting portions 6a directed towards the protruding members 5 with a predetermined interval, and these connecting portions 6a are connected to the protruding members 5 to form a meandering reactant gas channel for the fuel gas supplied from the communicating hole 2, with a plurality of protruding members 5 being collected as one unit.

In the above described prior art, by using the press-formed separator made of a metal, the separator can be manufactured within a short period of time, compared to the case where it is manufactured by cutting or the like, and this is advantageous in view of strength, but there is a problem in that position adjustment between the connecting portions 6a and the protruding members 5, in particular, height adjustment is difficult. If the connecting portions 6a overlap on the protruding portions 5, these overlapped portions rise up, and as a result, the electrolyte membrane electrode assembly is damaged. On the other hand, if a gap is formed between the connecting portions 6a and the protruding portions 5, gas leakage occurs thereby decreasing the reaction efficiency.

Moreover, if a strict dimensional accuracy control is performed so that the above described gap is not formed, there is a problem in that the manufacturing process becomes complicated as a whole, even if the productivity of the separator itself is improved by means of the press forming.

SUMMARY OF THE INVENTION

It is therefore an object of the present invention to provide a fuel cell wherein production of the separator is easy and the reactant gas channel can be easily arranged, to thereby improve productivity.

In order to solve the above described problems, the invention according to a first aspect is a fuel cell constituted by clamping an electrolyte membrane electrode assembly provided with an anode and a cathode at opposite positions on both sides of an electrolyte membrane, by a pair of separators (for example, a cathode side separator 10 and an anode side separator 11 in the embodiment) via a sealing member (for example, sealing members CS, AS in the embodiment), characterized in that a part of a reactant gas channel (for example, reactant gas channels 211, 212, 291, 292 in the embodiments) formed between the electrolyte membrane electrode assembly and the separator is formed seamlessly by a part of the sealing member.

By having such a construction, the reactant gas channel is formed easily by effectively utilizing the sealing member, and hence the shape of the reactant gas channel formed in the separator can be simplified. In addition, the portion where the sealing member forming a part of the reactant gas channel is arranged may be flat. Hence the degree of freedom in designing the shape of the reactant gas channel is increased. Moreover, since a part of the reactant gas channel is formed seamlessly by a part of the sealing member, there is no possibility of gas leakage from the junction portion.

The invention according to a second aspect is characterized in that the separator is formed from a metal thin plate.

By having such a construction, it becomes possible to manufacture the separator by press forming, thereby improving productivity. Moreover, since the separator may be flat, the press formability is also improved.

The invention according to a third aspect is characterized in that the reactant gas channel has a turning portion (for example, connection paths 201, 202, 281 and 282 in the embodiments), and a boundary portion of the turning portion (for example, extended portions CS1, CS2, AS1 and AS2 in the embodiments) is constituted by the sealing member.

By having such a construction, since the turning portion can be formed by the sealing member, the shape of a groove or the like formed in the separator can be simplified as much as possible.

DESCRIPTION OF THE PREFERRED EMBODIMENTS

Embodiments of the present invention will now be described with reference to the drawings. FIG. 1 to FIG. 9 show a first embodiment of the invention.

Figure 1:
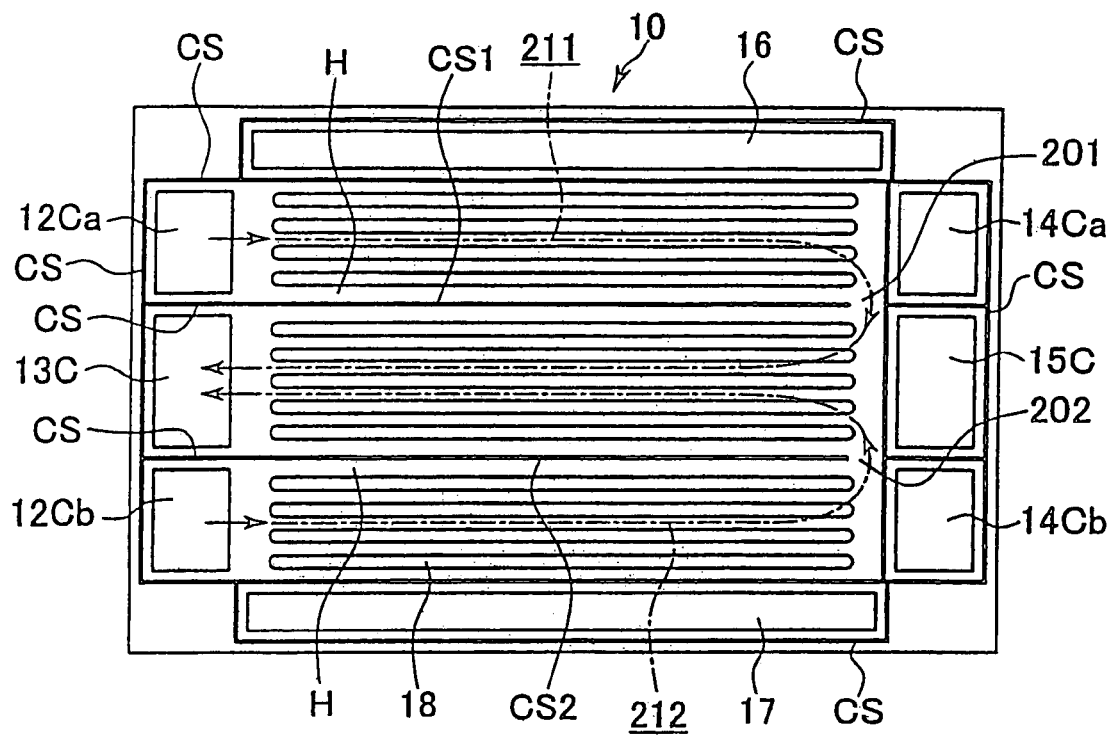
FIG. 1 is a plan view of a cathode side separator in a first embodiment of the present invention.

FIG. 1 shows a cathode side separator 10 which is press-formed from a metal material such as a stainless steel sheet material. The cathode side separator 10 clamps an electrolyte membrane electrode assembly together with an anode side separator 11 described later, to thereby constitute a fuel cell. These are further laminated in a plurality of sets in the horizontal direction, to thereby constitute a fuel cell stack mounted on, for example, vehicles.

In the cathode side separator 10, there are formed three communicating holes 12Ca, 13C and 12Cb at the left side edge, and three communicating holes 14Ca, 15C and 14Cb at the right side edge, respectively. At the upper side edge and the lower side edge, there is respectively formed one communicating hole 16, 17. That is to say, this embodiment is a so-called internal manifold type.

Specifically, the inlet side communicating holes 12Ca and 12Cb for an oxidant gas (for example, air) are respectively formed on the upper side and the lower side of the left side edge of the cathode side separator 10, and the outlet side communicating hole 13C for the oxidant gas is formed in the center of the left side edge. On the other hand, the inlet side communicating holes 14Ca and 14Cb for a fuel gas (for example, hydrogen containing gas) are respectively formed on the upper side and the lower side of the right side edge of the cathode side separator 10, and the outlet side communicating hole 15C for the fuel gas is formed in the center of the right side edge.

Moreover, the outlet side communicating hole 16 for a coolant (for example, ethylene glycol) is formed at the upper side edge of the cathode side separator 10, and the inlet side communicating hole 17 for the coolant is formed at the lower side edge thereof.

The portion surrounded by the respective communicating holes 12Ca, 12Cb and 13C for the oxidant gas, the respective communicating holes 14Ca, 14Cb and 15C for the fuel gas, and the respective communicating holes 17 and 16 for the coolant is constructed as a reaction plane to which the oxidant gas is supplied.

On the reaction plane, there are provided a plurality of grooves 18 extending linearly in the lateral direction in units of several grooves (four, five and four from the top) by press forming. Here, the grooves 18 are concave portions of the portions formed in a corrugation, and on the backside of the cathode side separator 10 shown in FIG. 2, these are formed as protruding members 19.

The end portion on the left of each groove 18 is arranged with a predetermined space from the right side edge position of each communicating hole 12Ca, 12Cb and 13C for the oxidant gas, and the end portion on the right of each groove 18 is arranged with a predetermined space from the left side edge position of each communicating hole 14Ca, 14Cb and 15C for the fuel gas.

Referring to FIG. 1, the peripheries of the inlet side communicating holes 14Ca and 14Cb and the outlet side communicating hole 15C for the fuel gas, and the inlet side communicating hole 17 and the outlet side communicating hole 16 for the coolant are surrounded by a sealing member CS, respectively.

Moreover, the inlet side communicating holes 12Ca and 12Cb and the outlet side communicating hole 13C for the oxidant gas are surrounded by the sealing member CS, with the exception of the right side edge thereof.

That is to say, the inlet side communicating holes 12C*a* and 12C*b* and the outlet side communicating hole 13C for the oxidant gas are communicated with the reaction plane at the right side edge, respectively.

A sealing member CS is provided between the inlet side communicating hole 12C*a* and the outlet side communicating hole 13C for the oxidant gas. This sealing member CS extends between the grooves 18 on the reaction plane without a seam, and has an extended portion CS1 reaching to the vicinity of the right side end portions of the grooves 18.

Moreover, a sealing member CS is provided between the inlet side communicating hole 12C*b* and the outlet side communicating hole 13C for the oxidant gas, and this sealing member CS extends between the grooves 18 on the reaction plane without a seam, and has an extended portion CS2 reaching to the vicinity of the right side end portions of the grooves 18. The sealing member CS and the extended portions CS1 and CS2 are attached by injection, baking, bonding or the like.

Here, the spaces between the grooves 18 where the extended portions CS1 and CS2 are provided means the spaces between respective units of the grooves 18 formed in units as described above, and these portions are flat surfaces H where the press forming is not performed.

Here, a space for forming a connecting path 201 is ensured between the right side end portion of the extended portion CS1 and the sealing member CS arranged at a position facing this extended portion CS1. Moreover, a space for forming a connecting path 202 is ensured between the right side end portion of the extended portion CS2 and the sealing member CS arranged at a position facing this extended portion CS2.

As a result, on the reaction plane of the cathode side separator 10, there are formed a U-shaped reactant gas (oxidant gas) channel 211 with the extended portion CS1 being the boundary portion, and the connecting path 201 being the turning portion, and a U-shaped reactant gas channel 212 with the extended portion CS2 being the boundary portion, and the connecting path 202 being the turning portion.

Figure 2:
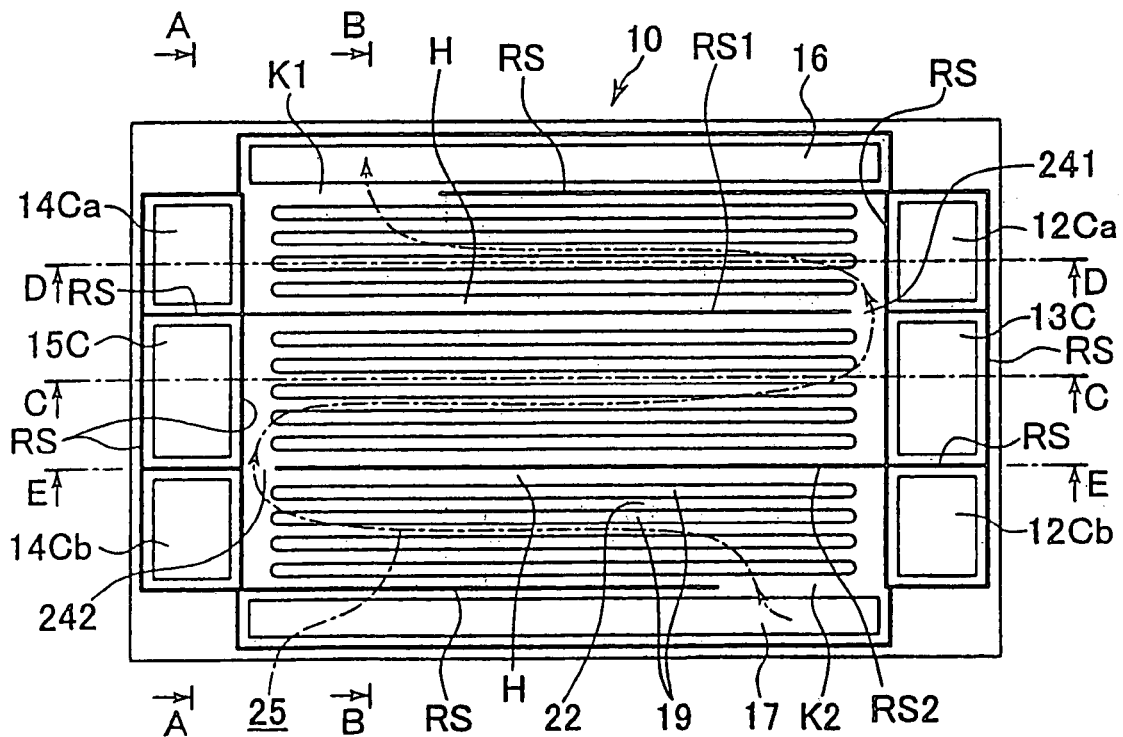
FIG. 2 is a back view of the cathode side separator shown in FIG. 1.

On the other hand, FIG. 2 shows the cathode side separator 10 in FIG. 1 as seen from the backside. Therefore, the right side edge in FIG. 2 corresponds to the left side edge in FIG. 1, and the left side edge in FIG. 2 corresponds to the right side edge in FIG. 1. Specifically, the inlet side communicating holes 12C*a* and 12C*b* for the oxidant gas are respectively formed on the upper side and the lower side of the right side edge thereof, and the outlet side communicating hole 13C for the oxidant gas is formed in the center of the right side edge. Also, the inlet side communicating holes 14C*a* and 14C*b* for the fuel gas are respectively formed on the upper side and the lower side of the left side edge thereof, and the outlet side communicating hole 15C for the fuel gas is formed in the center of the left side edge.

Moreover, the outlet side communicating hole 16 for the coolant is formed at the upper side edge of the cathode side separator 10, and the inlet side communicating hole 17 for the coolant is formed at the lower side edge thereof, as in FIG. 1.

The portion surrounded by the respective communicating holes 12C*a*, 12C*b* and 13C for the oxidant gas, the respective communicating holes 14C*a*, 14C*b* and 15C for the fuel gas, and the respective communicating holes 17 and 16 for the coolant is constructed as a cooling plane to which the coolant is supplied.

On the cooling plane, there are formed protruding members 19 at positions corresponding to the grooves 18 described referring to FIG. 1. Therefore, these protruding members 19 are formed in units of several ribs (four, five and four from the top), similarly to the grooves 18. Here, the protruding members 19 are convex portions of the portions formed in a corrugation. Therefore, grooves 22 are formed between adjacent protruding members 19.

The end portion on the right of each protruding member 19 is arranged with a predetermined space from the left side edge position of each communicating hole 12C*a*, 12C*b*, 13C for the oxidant gas, and the end portion on the left of each protruding member 19 is arranged with a predetermined space from the right side edge position of each communicating hole 14C*a*, 14C*b* and 15C for the fuel gas.

Referring to FIG. 2, the peripheries of the inlet side communicating holes 12C*a* and 12C*b* and the outlet side communicating hole 13C for the oxidant gas, the inlet side communicating holes 14C*a* and 14C*b* and the outlet side communicating hole 15C for the fuel gas are surrounded by a sealing member RS, respectively.

The periphery of the outlet side communicating hole 16 for the coolant is also surrounded by the sealing member RS, with the exception of the portion where a part of the cooling plane side (the left side in FIG. 2) is excised as a notch portion K1. Moreover, the periphery of the inlet side communicating hole 17 for the coolant is surrounded by the sealing member RS, with the exception of the portion where a part of the cooling plane side (the right side in FIG. 2) is excised as a notch portion K2.

That is to say, the inlet side communicating hole 17 for the coolant is communicated with the cooling plane in the notch portion K2, and the outlet side communicating hole 16 is communicated with the cooling plane in the notch portion K1.

A sealing member RS is provided between the inlet side communicating hole 14C*a* and the outlet side communicating hole 1 5C for the fuel gas. This sealing member RS extends between the protruding members 19 on the cooling plane without a seam, and has an extended portion RS1 reaching to the vicinity of the right side end portions of the protruding members 19.

Moreover, a sealing member RS is provided between the inlet side communicating hole 12C*b* and the outlet side communicating hole 13C for the oxidant gas, and this sealing member RS extends between the protruding members 19 on the cooling plane without a seam, and has an extended portion RS2 reaching to the vicinity of the left side end portions of the protruding members 19. The sealing member RS and the extended portions RS1 and RS2 are attached by injection, baking, bonding or the like.

Here, the spaces between protruding members 19 where the extended portions RS1 and RS2 are provided means the spaces between respective units of the protruding members 19 formed in units as described above, and these portions are flat surfaces H where the press forming is not performed.

Here, a space for forming a connecting path 241 is ensured between the right side end portion of the extended portion RS1 and the sealing member RS arranged at a position facing this extended portion RS1. Moreover, a space for forming a connecting path 242 is also ensured between the left side end portion of the extended portion RS2 and the sealing member RS arranged at a position facing this extended portion RS2.

As a result, on the cooling plane of the cathode side separator 10, there is formed a meandering coolant channel 25 with the extended portion RS2 and the extended portion RS1 being the boundary portion, and the two connecting paths 242 and 241 being the turning portion.

Figure 3:
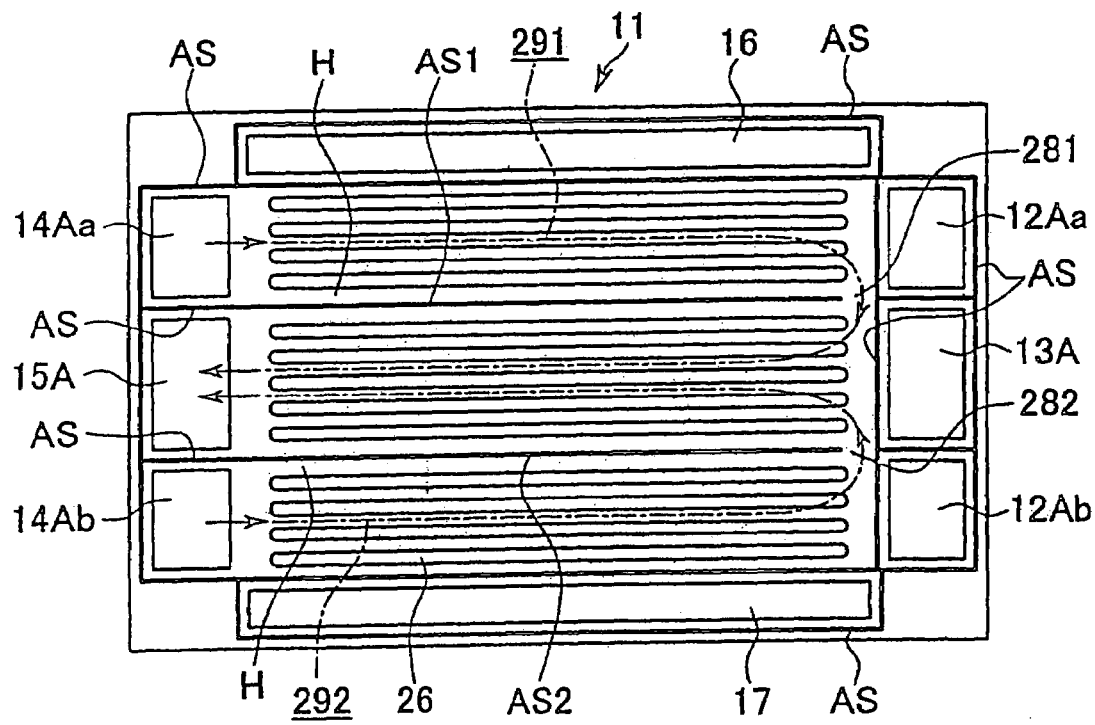
FIG. 3 is a plan view of an anode side separator in the first embodiment of the present invention.

FIG. 3 shows an anode side separator 11 press-formed from a metal material such as a stainless steel sheet material, as with the cathode side separator 10 shown in FIG. 1, and clamps the electrolyte membrane electrode assembly at a position facing the cathode side separator 10.

In the anode side separator 11, there are formed corresponding to the cathode side separator 10, three communicating holes 12A*a*, 13A and 12A*b* at the left side edge, and three communicating holes 14A*a*, 15A and 14A*b* at the right side edge. Moreover, at the upper side edge and the lower side edge, there is respectively formed one communicating hole 16, 17. As with the cathode side separator 10 shown in FIG. 10, this results in an internal manifold type.

Specifically, the inlet side communicating holes 12A*a* and 12A*b* for an oxidant gas are respectively formed on the upper side and the lower side of the left side edge of the anode side separator 11, and the outlet side communicating hole 13A for the oxidant gas is formed in the center of the right side edge. On the other hand, the inlet side communicating holes 14A*a* and 14A*b* for a fuel gas are respectively formed on the upper side and the lower side of the left side edge of the anode side separator 11, and the outlet side communicating hole 15A for the fuel gas is formed in the center of the left side edge.

Moreover, the outlet side communicating hole 16 for the coolant is formed at the upper side edge of the anode side separator 11, and the inlet side communicating hole 17 for the coolant is formed at the lower side edge thereof.

The portion surrounded by the respective communicating holes 12A*a*, 12A*b* and 13A for the oxidant gas, the respective communicating holes 14A*a*, 14A*b* and 15A for the fuel gas, and the respective communicating holes 17 and 16 for the coolant is constructed as a reaction plane to which the fuel gas is supplied.

On the reaction plane, corresponding to the cathode side separator 10, there are provided a plurality of grooves 26 extending linearly in the lateral direction in units of several grooves (four, five and four from the top) by press forming. Here, the grooves 26 are concave portions of the portions formed in a corrugation, and on the backside of the anode side separator 11 shown in FIG. 4, these are formed as protruding members 27.

The end portion on the right of each groove 26 is arranged with a predetermined space from the left side edge position of each communicating hole 12A*a*, 12A*b* and 13A for the oxidant gas, and the end portion on the left of each groove 26 is arranged with a predetermined space from the right side edge position of each communicating hole 14A*a*, 14A*b* and 15A for the fuel gas.

Referring to FIG. 3, the peripheries of the inlet side communicating holes 12A*a* and 12A*b* and the outlet side communicating hole 13A for the fuel gas, and the inlet side communicating hole 17 and the outlet side communicating hole 16 for the coolant are surrounded by a sealing member AS, respectively.

The inlet side communicating holes 14A*a* and 14A*b* and the outlet side communicating hole 15A for the fuel gas are also surrounded by the sealing member AS, with the exception of the right side edge thereof.

That is to say, the inlet side communicating holes 14A*a* and 14A*b* and the outlet side communicating hole 15A for the fuel gas are communicated with the reaction plane at the right side edge, respectively.

A sealing member AS is provided between the inlet side communicating hole 14A*a* and the outlet side communicating hole 15A for the fuel gas. This sealing member AS extends between the grooves 26 on the reaction plane without a seam, and has an extended portion AS1 reaching to the vicinity of the right side end portions of the grooves 26.

Moreover, a sealing member AS is provided between the inlet side communicating hole 14A*b* and the outlet side communicating hole 15A for the fuel gas, and this sealing member AS extends between the grooves 26 on the reaction plane without a seam, and has an extended portion AS2 reaching to the vicinity of the right side end portions of the grooves 26. The sealing member AS and the extended portions AS1 and AS2 are attached by injection, baking, bonding or the like.

Here, the spaces between the grooves 26 where the extended portions AS1 and AS2 are provided means the spaces between respective units of the grooves 26 formed in units as described above, and these portions are flat surfaces H where the press forming is not performed.

Here, a space for forming a connecting path 281 is ensured between the right side end portion of the extended portion AS1 and the sealing member AS arranged at a position facing this extended portion AS1. A space for forming a connecting path 282 is also ensured between the right side end portion of the extended portion AS2 and the sealing member AS arranged at a position facing this extended portion AS2.

As a result, on the reaction plane of the anode side separator 11, there are formed a U-shaped reactant gas (fuel gas) channel 291 with the extended portion AS1 being the boundary portion, and the connecting path 281 being the turning portion, and a U-shaped reactant gas channel 292 with the extended portion AS2 being the boundary portion, and the connecting path 282 being the turning portion.

Figure 4:
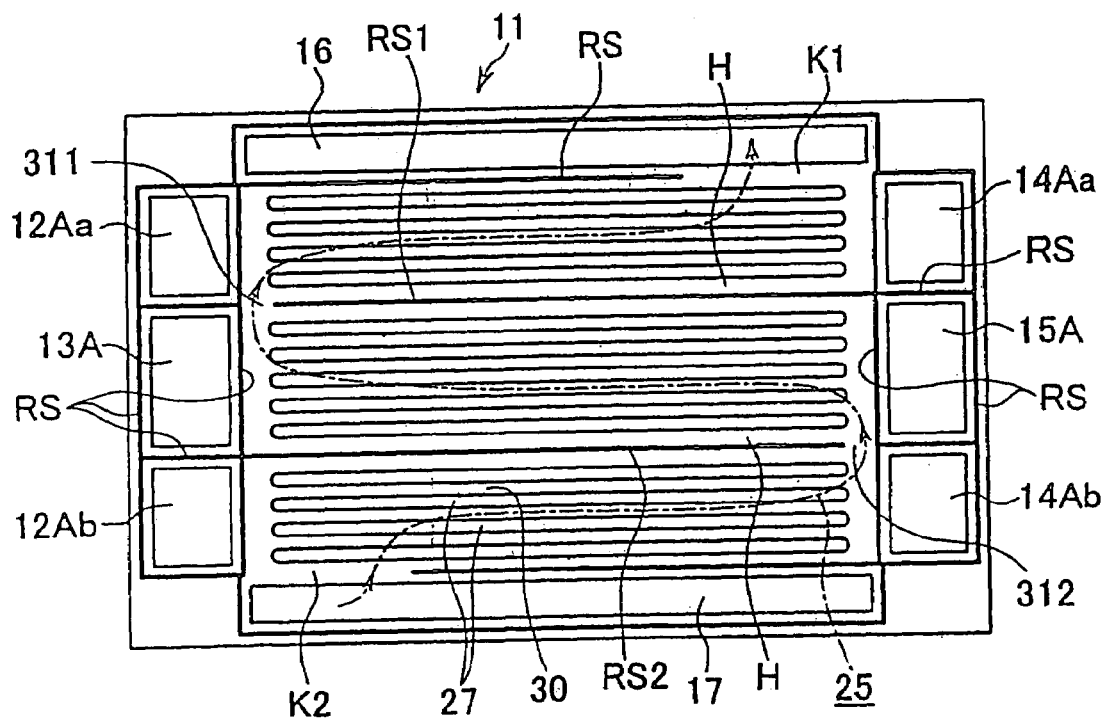
FIG. 4 is a back view of the anode side separator shown in FIG. 3.

On the other hand, FIG. 4 shows the anode side separator 11 in FIG. 3 as seen from the backside. Therefore, the right side edge in FIG. 4 corresponds to the left side edge in FIG. 3, and the left side edge in FIG. 4 corresponds to the right side edge in FIG. 3. Specifically, the inlet side communicating holes 12A*a* and 12A*b* for the oxidant gas are respectively formed on the upper side and the lower side of the left side edge thereof, and the outlet side communicating hole 13A for the oxidant gas is formed in the center of the left side edge. Also, the inlet side communicating holes 14A*a* and 14A*b* for the fuel gas are respectively formed on the upper side and the lower side of the right side edge thereof, and the outlet side communicating hole 15A for the fuel gas is formed in the center of the right side edge.

Moreover, the outlet side communicating hole 16 for the coolant is formed at the upper side edge of the anode side separator 11, and the inlet side communicating hole 17 for the coolant is formed at the lower side edge thereof, as in FIG. 3.

The portion surrounded by the respective communicating holes 12A*a*, 12A*b* and 13A for the oxidant gas, the respective communicating holes 14A*a*, 14A*b* and 15A for the fuel gas, and the respective communicating holes 17 and 16 for the coolant is constructed as a cooling plane to which the coolant is supplied.

On the cooling plane, there are formed protruding members 27 at positions corresponding to the grooves 26 described referring to FIG. 3. Therefore, these protruding members 27 are formed in units of several ribs (four, five and four from the top), similarly to the grooves 26. Here, the protruding members 27 are convex portions of the portions formed in a corrugation. Therefore, grooves 30 are formed between adjacent protruding members 27.

The end portion on the left of each protruding member 27 is arranged with a predetermined space from the right side edge position of each communicating hole 12A$a$, 12A$b$ and 13A for the oxidant gas, and the end portion on the right of each protruding member 27 is arranged with a predetermined space from the left side edge position of each communicating hole 14A$a$, 14A$b$ and 15A for the fuel gas.

Referring to FIG. 4, the peripheries of the inlet side communicating holes 12A$a$ and 12A$b$ and the outlet side communicating hole 13A for the oxidant gas, the inlet side communicating holes 14A$a$ and 14A$b$ and the outlet side communicating hole 15A for the fuel gas are surrounded by a sealing member RS, respectively.

The periphery of the outlet side communicating hole 16 for the coolant is also surrounded by the sealing member RS, with the exception of the portion where a part of the cooling plane side (the right side in FIG. 4) is excised as a notch portion K1. Moreover, the periphery of the inlet side communicating hole 17 for the coolant is surrounded by the sealing member RS, with the exception of the portion where a part of the cooling plane side (the left side in FIG. 4) is excised as a notch portion K2.

That is to say, the inlet side communicating hole 17 for the coolant is communicated with the cooling plane in the notch portion K2, and the outlet side communicating hole 16 is communicated with the cooling plane in the notch portion K1.

A sealing member RS is provided between the inlet side communicating hole 14A$a$ and the outlet side communicating hole 15A for the fuel gas. This sealing member RS extends between the protruding members 27 on the cooling plane without a seam, and has an extended portion RS1 reaching to the vicinity of the left side end portions of the protruding members 27.

Moreover, a sealing member RS is provided between the inlet side communicating hole 12A$b$ and the outlet side communicating hole 13A for the oxidant gas, and this sealing member RS extends between the protruding members 27 on the cooling plane without a seam, and has an extended portion RS2 reaching to the vicinity of the right side end portions of the protruding members 27. The sealing member RS and the extended portions RS1 and RS2 are attached by injection, baking, bonding or the like.

Here, the spaces between protruding members 27 where the extended portions RS1 and RS2 are provided means the spaces between respective units of the protruding members 27 formed in units as described above, and these portions are flat surfaces H where the press forming is not performed.

Here, a space for forming a connecting path 311 is ensured between the left side end portion of the extended portion RS1 and the sealing member RS arranged at a position facing this extended portion RS1. Moreover, a space for forming a connecting path 312 is also ensured between the right side end portion of the extended portion RS2 and the sealing member RS arranged at a position facing this extended portion RS2.

As a result, on the cooling plane of the anode side separator 11, there is formed a meandering coolant channel 25 with the extended portion RS2 and the extended portion RS1 being the boundary portion, and the two connecting paths 312 and 311 being the turning portion.

FIG. 5 to FIG. 9 show in cross-section for each part of FIG. 2, a fuel cell 8 constructed such that an electrolyte membrane electrode assembly 7 is clamped by the cathode side separator 10 and the anode side separator 11.

Figure 5:
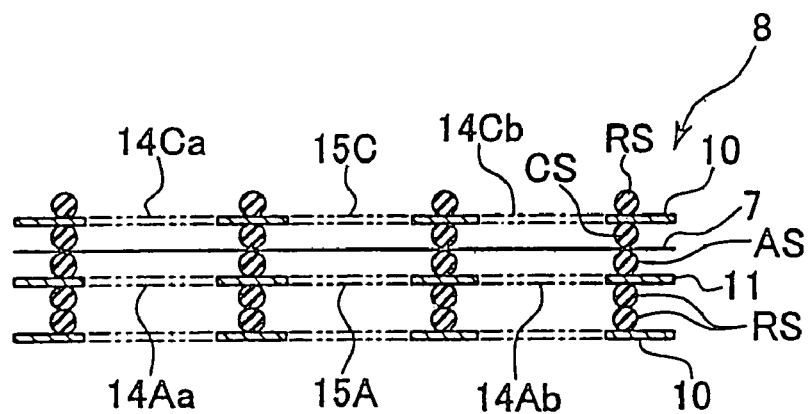
FIG. 5 is a cross-section of a fuel cell along the line A—A in FIG. 2.

FIG. 5 is a cross-section along the line A—A in FIG. 2. In this figure, the electrolyte membrane electrode assembly 7 is constituted by a solid polymer electrolyte membrane, with an anode and an cathode provided at opposite positions on both sides of the solid polymer electrolyte membrane, and the electrolyte membrane electrode assembly 7 is clamped by the cathode side separator 10 and the anode side separator 11 via the sealing members CS and AS.

In this case, the inlet side communicating holes 12C$a$, 12C$b$ and the outlet side communicating hole 13C for the oxidant gas in the cathode side separator 10 in FIG. 1 match with the inlet side communicating holes 12A$a$, 12A$b$ and the outlet side communicating hole 13A for the oxidant gas in the anode side separator 11 in FIG. 3. Also, the inlet side communicating holes 14C$a$, 14C$b$ and the outlet side communicating hole 15C for the fuel gas in the cathode side separator 10 in FIG. 1 match with the inlet side communicating holes 14A$a$, 14A$b$ and the outlet side communicating hole 15A for the fuel gas in the anode side separator 11 in FIG. 3. The electrolyte membrane electrode assembly 7 is clamped therebetween on the reaction plane, with each part matching to each other.

Moreover, since the cathode side separator 10 and the anode side separator 11 clamping the electrolyte membrane electrode assembly 7 are laminated in a plurality of numbers, each cooling plane faces each other at an adjoining portion. That is to say, the inlet side communicating holes 12C$a$, 12C$b$ and the outlet side communicating hole 13C for the oxidant gas in the cathode side separator 10 in FIG. 2 match with the inlet side communicating holes 12A$a$, 12A$b$ and the outlet side communicating hole 13A for the oxidant gas in the anode side separator 11 in FIG. 4. On the other hand, the inlet side communicating holes 14C$a$ and 14C$b$ and the outlet side communicating hole 15C for the fuel gas in the cathode side separator 10 in FIG. 2 match with the inlet side communicating holes 14A$a$ and 14A$b$ and the outlet side communicating hole 15A for the fuel gas in the anode side separator 11 in FIG. 4.

In a condition with these separators laminated in this manner, the above described reactant gas (oxidant gas) channels 211 and 212 are formed between the cathode side separator 10 and the electrolyte membrane electrode assembly 7, and the above described reactant gas (fuel gas) channels 291 and 292 are formed between the anode side separator 11 and the electrolyte membrane electrode assembly 7, and the above described coolant channel 25 is formed between the anode side separator 11 and the cathode side separator 10.

Moreover, as shown in FIG. 5, the inlet side communicating holes 14C$a$ and 14C$b$ and the outlet side communicating hole 15C for the fuel gas in the cathode side separator 10 are sealed by the sealing member CS together with the inlet side communicating holes 14A$a$ and 14A$b$ and the outlet side communicating hole 15A for the fuel gas in the anode side separator 11.

Figure 6:
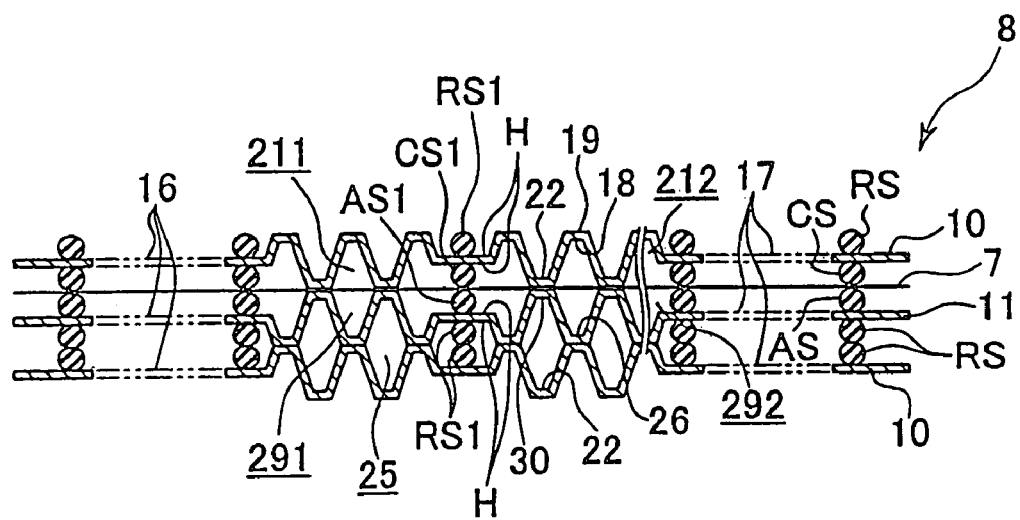
FIG. 6 is a cross-section of a fuel cell along the line B—B in FIG. 2.

FIG. 6 is a cross-section along the line B—B in FIG. 2. In this figure, the extended portions RS1 of the sealing members RS are in close contact with each other, in order to form the coolant channel 25 meandering between the cooling plane of the cathode side separator 10 and the cooling plane of the anode side separator 11. Also, the protruding members on the reaction plane of the cathode side separator 10 and on the reaction plane of the anode side separator 11

(the backsides of the grooves 22 and the grooves 30) clamp the electrolyte membrane electrode assembly 7 therebetween, and the grooves 22 on the cooling plane of the cathode side separator 10 and the grooves 30 on the cooling plane of the anode side separator 11 face each other to thereby form the coolant channel 25.

Figure 7:
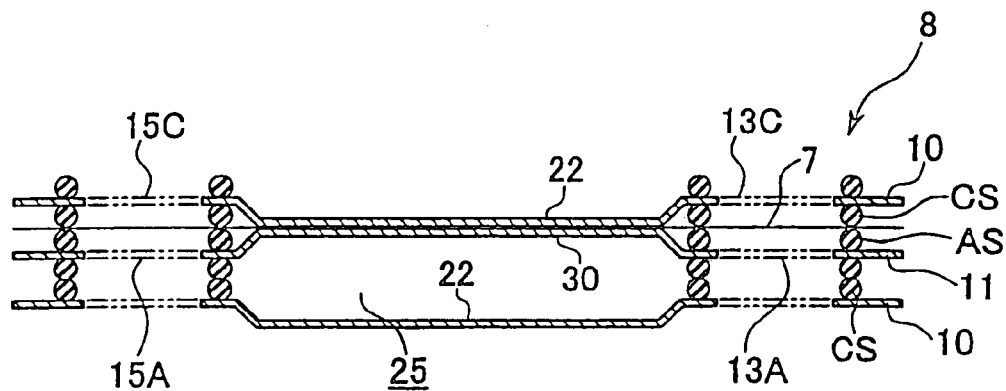
FIG. 7 is a cross-section of a fuel cell along the line C—C in FIG. 2.

FIG. 7 is a cross-section along the line C—C in FIG. 2. This figure shows the condition where the respective protruding members on the reaction plane of the cathode side separator 10 and on the reaction plane of the anode side separator 11 (the backsides of the grooves 22 and the grooves 30) clamp the electrolyte membrane electrode assembly 7 therebetween, and the condition where the grooves 22 on the cooling plane of the cathode side separator 10 and the grooves 30 on the cooling plane of the anode side separator 11 face each other to thereby form the coolant channel 25.

Figure 8:
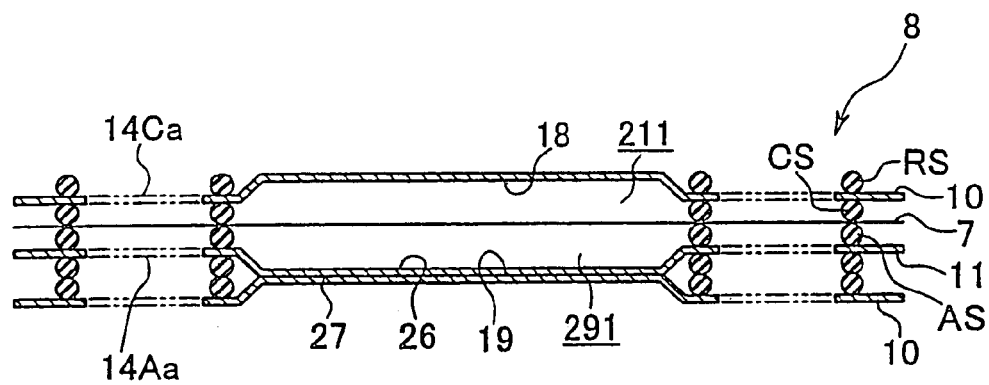
FIG. 8 is a cross-section of a fuel cell along the line D—D in FIG. 2.
Figure 9:
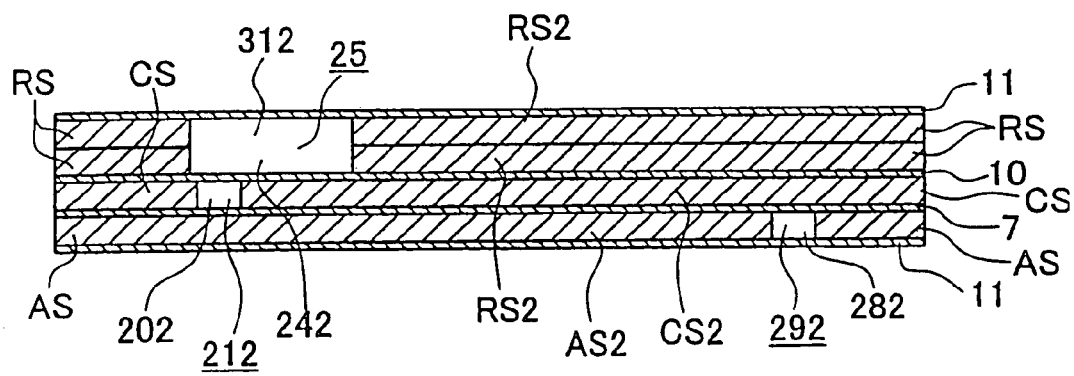
FIG. 9 is a cross-section of a fuel cell along the line E—E in FIG. 2.

Furthermore, FIG. 8 is a cross-section along the line D—D in FIG. 2. This figure shows the condition where the grooves 18 on the reaction plane of the cathode side separator 10 and the grooves 26 on the reaction plane of the anode side separator 11 form the reactant gas channels 211 and 291 between the electrolyte membrane electrode assembly 7 and those separators, respectively, and the condition where the protruding members 19 on the cooling plane of the cathode side separator 10 and the protruding members 27 on the cooling plane of the anode side separator 11 are located closely to partition the coolant channel. FIG. 9 is a cross-section along the line E—E in FIG. 2, showing the condition where each sealing member AS, CS, RS is located closely to each other, including the respective extended portions AS2, CS2 and RS2.

In the above described embodiment, when the oxidant gas is supplied to the fuel cell 8, this oxidant gas is supplied, as shown in FIG. 1, from the inlet side communicating holes 12Ca and 12Cb for the oxidant gas in the cathode side separator 10 to the reaction plane of the cathode side separator 10. Then, the oxidant gas flows into the U-shaped reactant gas channel 211 having the extended portion CS1 as the boundary portion and the connecting path 201 as the turning portion, and the U-shaped reactant gas channel 212 having the extended portion CS2 as the boundary portion and the connecting path 202 as the turning portion, and the reacted gas is exhausted from the outlet side communicating hole 13C for the oxidant gas.

On the other hand, in a similar manner, when the fuel gas is supplied to the fuel cell, this fuel gas is supplied, as shown in FIG. 3, from the inlet side communicating holes 14Aa and 14Ab for the fuel gas in the anode side separator 11 to the reaction plane of the anode side separator 11. Then, the fuel gas flows into the U-shaped reactant gas channel 291 having the extended portion AS1 as the boundary portion and the connecting path 281 as the turning portion, and the U-shaped reactant gas channel 292 having the extended portion AS2 as the boundary portion and the connecting path 282 as the turning portion, and the reacted gas is exhausted from the outlet side communicating hole 15A for the fuel gas.

As a result, by the supplied fuel gas and oxidant gas, electric energy is generated between the cathode side separator 10 and the anode side separator 11 via the solid polymer electrolyte membrane, to thereby generate power.

Furthermore, when the coolant is supplied to the fuel cell, this coolant is supplied, as shown in FIG. 2 and FIG. 4, from the inlet side communicating hole 17 for the coolant in the cathode side separator 10 and the anode side separator 11 to the cooling plane of each separator 10, 11. Then, the coolant flows into the meandering coolant channel 25 having the extended portions RS2 and RS1 as the boundary portion and the connecting paths 242 and 312 and the connecting paths 241 and 311 as the turning portion, and is exhausted from the outlet side communicating hole 16 for the coolant. As a result, the fuel cell can be cooled.

Therefore, according to the first embodiment, the reactant gas channels 211 and 212 are easily formed in the cathode side separator 10, and the reactant gas channels 291 and 292 in the anode side separator 11, by effectively utilizing the extended portions CS1, CS2, AS1 and AS2 of the sealing members CS and AS. Hence, the grooves 18 and 26 having a simple shape need only be press-formed on each separator 10, 11, enabling simplification of the shape. Moreover, the separator surface where the extended portions CS1, CS2, AS 1 and AS2 of the sealing members CS and AS are arranged is a flat surface H, and hence it is not necessary to perform press forming. As a result, the degree of freedom in designing the shape of the reactant gas channel is increased.

Furthermore, a part of the reactant gas channels 211 and 212 formed between the electrolyte membrane electrode assembly 7 and the cathode side separator 10 and a part of the reactant gas channels 291 and 292 formed between the electrolyte membrane electrode assembly 7 and the anode side separator 11 are formed seamlessly by the extended portions CS1, CS2, AS1 and AS2 of the sealing members CS and AS. Hence, there is no possibility of gas leakage from the junction portion.

As a result, the reactant gas channel can be easily arranged without performing strict dimensional control.

Similarly, apart of the coolant channel 25 can be easily formed between the cathode side separator 10 and the anode side separator 11, by effectively utilizing the extended portions RS1 and RS2 of the sealing members RS. Hence, grooves 18 and 26 having a simple shape need only be press-formed on each separator 10, 11, enabling simplification of the shape. Moreover, the separator surface where the extended portions RS1 and RS2 of the sealing members RS are arranged is a flat surface H, and hence it is not necessary to perform press forming. As a result, the degree of freedom in designing the shape of the channel is increased.

Furthermore, the extended portions RS1 and RS2 of the sealing members RS are formed seamlessly, and hence there is no possibility of gas leakage from the junction portion. As a result, the coolant gas channel can be easily arranged without performing strict dimensional control.

In this embodiment, the turning side of the oxidant gas flowing in the reaction plane of the cathode side separator in FIG. 1 (the right side edge in FIG. 1) is set to the inlet side of the fuel gas flowing in the reaction plane of the anode side separator in FIG. 3. Hence, water accumulated in the turning portion side passes through the solid polymer electrolyte membrane and back diffuses and moves to the fuel gas side. As a result, the fuel gas is sufficiently humidified to thereby accelerate the reaction.

Moreover, in this embodiment, in both the cathode side separator 10 and the anode side separator 11, the number of grooves 18 and 26 (five grooves) reaching from the connecting paths 201 and 202 and the connecting paths 281 and 282 to the outlet side communicating hole 13C and the outlet side communicating hole 15A is fewer than the total number of the grooves 18 and 26 (4+4=8 grooves) reaching from the inlet side communicating holes 12Ca and 12Cb and the inlet side communicating holes 14Ca and 14Cb to the connecting paths 201 and 202 and the connecting paths 282 and 282. Hence, the flow rate of each reactant gas can be increased, thereby enabling effective exhaust of the generated water. In order to increase the flow rate of the reactant gas, it is necessary to decrease the number of grooves on the outlet side, taking into consideration the portion decreased by using the reactant gas for the reaction.

In the above embodiment, since the inlet side communicating holes 12Ca and 12Cb and the inlet side communicating holes 14Ca and 14Cb are set towards the outside of each separator 10, 11, the efficiency of thermal radiation is high and the temperature easily drops, compared to a case where these are set inside. Hence, there is merit in that even if a specified amount of water is not supplied, it is easy to maintain the relative humidity to a specified value.

Furthermore, the left end portions of the groove 18 and 26 in the respective separators 10 and 11 are arranged with a predetermined space from the right side edge position of the communicating holes 12Ca, 12Cb and 13C for the oxidant gas and the communicating holes 14Aa, 14Ab and 15A for the fuel gas, and the right end portions of the groove 18 and 26 are arranged with a predetermined space from the left side edge position of the communicating holes 14Ca, 14Cb and 15C for the fuel gas and the communicating holes 12Aa, 12Ab and 13A for the oxidant gas, Therefore, even if the grooves 18 and 26 are partly blocked by the generated water, the portion formed by the above described predetermined space (the portion between the end portions of the grooves and the edge of each communicating hole) serves as a buffer portion so as to guide the reactant gas channel to a groove where blocking has not occurred. As a result, compared to a case where the grooves are provided continuous to the inlet side communicating hole 12Ca and the like, and the outlet side communicating hole 15A and the like, the effective reaction area is not greatly decreased.

A second embodiment of the invention will now be described with reference to FIG. 10 to FIG. 13.

Figure 10:
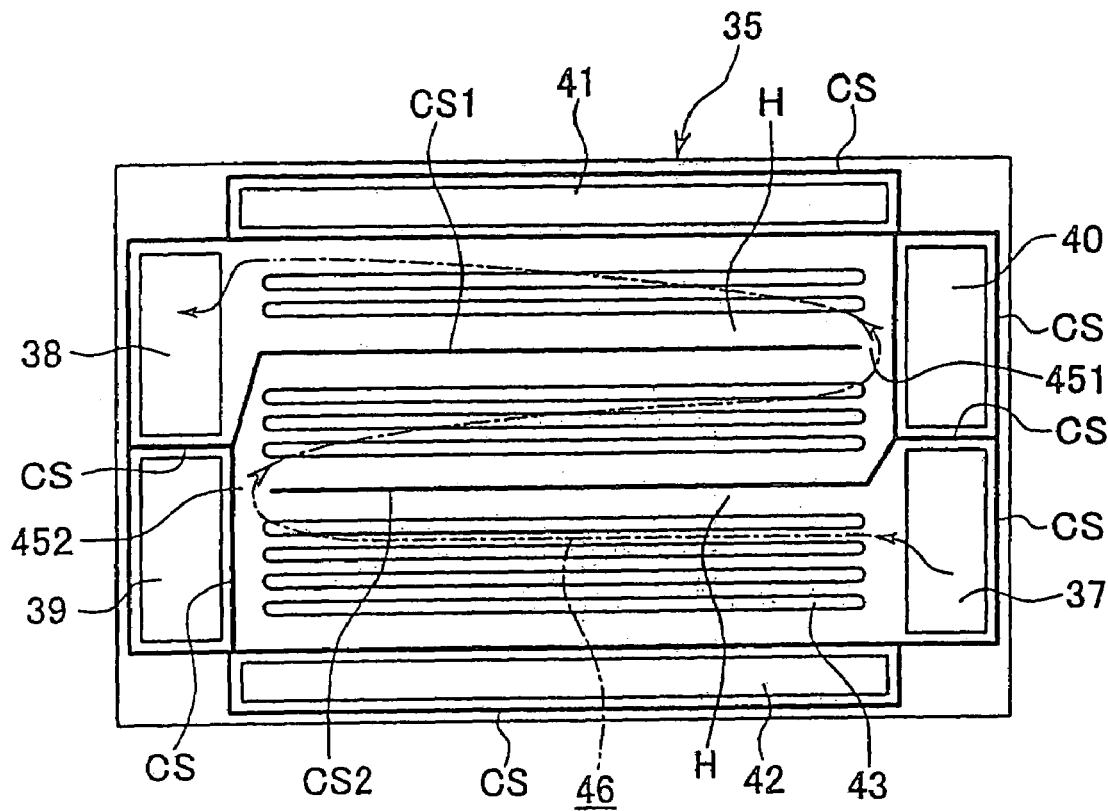
FIG. 10 is a plan view of a cathode side separator in a second embodiment of the present invention.

A cathode side separator 35 and an anode side separator 36 in this embodiment comprise respectively two communicating holes at the left and right side edges, differing from the above described embodiment. FIG. 10 shows the cathode side separator 35, which is press-formed from a metal material such as a stainless steel sheet material as in the above described embodiment, and clamps the electrolyte membrane electrode assembly 7 together with the anode side separator 36 described later.

In the cathode side separator 35, there are formed two communicating holes 37 and 40 at the right side edge and two communicating holes 38 and 39 at the left side edge, respectively. On the upper side edge and the lower side edge, there are formed respectively one communicating hole 41 and 42. That is to say, this embodiment is also a so-called internal manifold type.

The lower communicating hole at the right side edge is constructed as an inlet side communicating hole 37 for the oxidant gas (for example, air), and the upper communicating hole at the left side edge is constructed as an outlet side communicating hole 38 for the oxidant gas. On the other hand, the lower communicating hole at the left side edge is constructed as an inlet side communicating hole 39 for the fuel gas (for example, hydrogen), and the upper communicating hole at the right side edge is constructed as an outlet side communicating hole 40 for the fuel gas. Moreover, the communicating hole at the upper side edge is formed as an outlet side communicating hole 41 for the coolant (for example, ethylene glycol), and the communicating hole at the lower side edge is formed as an inlet side communicating hole 42 for the coolant. The portion surrounded by each communicating hole 37, 38 for the oxidant gas, each communicating hole 39, 40 for the fuel gas and each communicating hole 42, 41 for the coolant is constructed as a reaction plane.

On the reaction plane, there are provided a plurality of grooves 43 extending linearly in the lateral direction in units of several grooves (four, three and two from the bottom) by press forming. Here, the grooves 43 are concave portions of the portions formed in a corrugation, and on the backside of the cathode side separator 35 shown in FIG. 11, these are formed as protruding members 44.

Both end portions of each groove 43 are arranged with a predetermined space from the side edge position of the reaction plane side of each communicating hole 37 and 38 for the oxidant gas and each communicating hole 39 and 40 for the fuel gas.

Referring to FIG. 10, the peripheries of the communicating holes 39 and 40 and the communicating holes 41 and 42 for the coolant are surrounded by a sealing member CS, respectively.

Moreover, the inlet side communicating hole 37 and the outlet side communicating hole 38 for the oxidant gas are also surrounded by the sealing member CS, with the exception of the side edge of the reaction plane side. That is to say, the inlet side communicating hole 37 and the outlet side communicating hole 38 for the oxidant gas are communicated with the reaction plane.

A sealing member CS is provided between the outlet side communicating hole 38 for the oxidant gas and the inlet side communicating hole 39 for the fuel gas. This sealing member CS extends between the grooves 43 on the reaction plane without a seam, and has an extended portion CS1 reaching to the vicinity of the right side end portions of the grooves 43.

Moreover, a sealing member CS is provided between the inlet side communicating hole 37 for the oxidant gas and the outlet side communicating hole 40 for the fuel gas, and this sealing member CS extends between the grooves 43 on the reaction plane without a seam, and has an extended portion CS2 reaching to the vicinity of the left side end portions of the grooves 43.

The extended portion CS1 is inclined upwards at the base end, and then extends in the horizontal direction, while the extended portion CS2 is inclined downwards at the base end and then extends in the horizontal direction. Moreover, the sealing member CS and the extended portions CS1 and CS2 are attached by injection, baking, bonding or the like.

Here, the spaces between the grooves 43 where the extended portions CS1 and CS2 are provided means the spaces between respective units of the grooves 43 formed in units as described above, and these portions are flat surfaces H where the press forming is not performed.

A space for forming a connecting path 451 is ensured between the right side end portion of the extended portion CS1 and the sealing member CS arranged at a position facing this extended portion CS1. Moreover, a space for forming a connecting path 452 is ensured between the left side end portion of the extended portion CS2 and the sealing member CS arranged at a position facing this extended portion CS2.

As a result, on the reaction plane of the cathode side separator 35, there is formed a meandering reactant gas (oxidant gas) channel 46 with the extended portions CS1 and CS2 being the boundary portions, and the connecting paths 452 and 451 being the turning portions.

Figure 11:
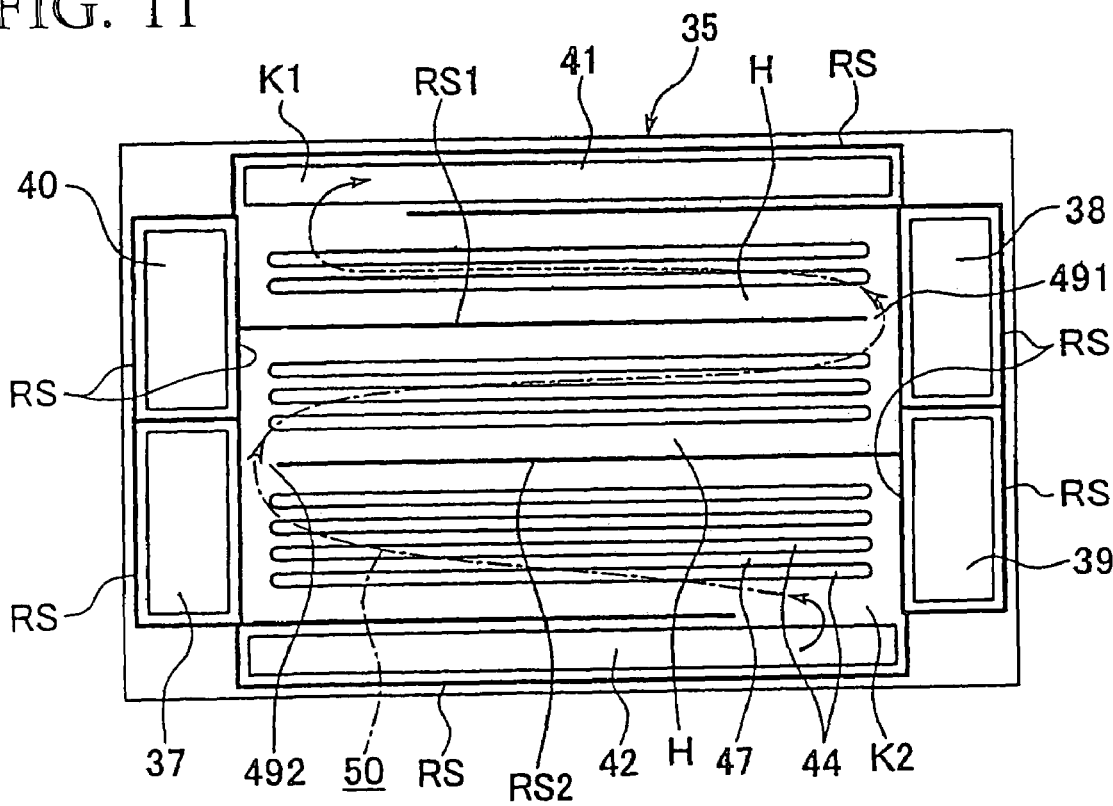
FIG. 11 is a back view of the cathode side separator shown in FIG. 10.

On the other hand, FIG. 11 shows the cathode side separator 35 in FIG. 10 as seen from the backside. Therefore, the right side edge in FIG. 11 corresponds to the left side edge in FIG. 10, and the left side edge in FIG. 11 corresponds to the right side edge in FIG. 10. Specifically, the outlet side communicating hole 38 for the oxidant gas and the inlet side communicating hole 39 for the fuel gas are respectively formed on the upper side and the lower side of the right side edge thereof. Also, the outlet side communicating hole 40 for the fuel gas and the inlet side communicating hole 37 for the oxidant gas are respectively formed on the upper side and the lower side of the left side edge thereof.

Moreover, the outlet side communicating hole 41 for the coolant is formed at the upper side edge of the cathode side separator 35, and the inlet side communicating hole 42 for the coolant is formed at the lower side edge thereof, as in FIG. 10.

The portion surrounded by the respective communicating holes 37 and 38 for the oxidant gas, the respective communicating holes 39 and 40 for the fuel gas, and the respective communicating holes 41 and 42 for the coolant is constructed as a cooling plane to which the coolant is supplied.

On the cooling plane, there are formed protruding members 44 at positions corresponding to the grooves 43 described above referring to FIG. 10. Therefore, these protruding members 44 are formed in units of several ribs (four, three and two from the bottom), similarly to the grooves 43. Here, the protruding members 44 are convex portions of the portions formed in a corrugation. Therefore, grooves 47 are formed between adjacent protruding members 44.

The opposite ends of each protruding member 44 is arranged with a predetermined space from the side edge positions on the reaction plane of each communicating hole 37, 38 for the oxidant gas, and each communicating hole 39, 40 for the fuel gas.

Referring to FIG. 11, the peripheries of each communicating hole 37, 38 for the oxidant gas and each communicating hole 39,40 for the fuel gas are surrounded by a sealing member RS, respectively.

The periphery of the outlet side communicating hole 41 for the coolant is also surrounded by the sealing member RS, with the exception of the portion where a part of the cooling plane side (the left side in FIG. 11) is excised as a notch portion K1. Moreover, the periphery of the inlet side communicating hole 42 for the coolant is surrounded by the sealing member RS, with the exception of the portion where a part of the cooling plane side (the right side in FIG. 11) is excised as a notch portion K2.

That is to say, the inlet side communicating hole 42 for the coolant is communicated with the cooling plane in the notch portion K2, and the outlet side communicating hole 41 is communicated with the cooling plane in the notch portion K1.

An extended portion RS1 is connected without a seam to the sealing member RS on the reaction plane side of the outlet side communicating hole 40 for the fuel gas, and extends between the protruding members 44 on the cooling plane, reaching to the vicinity of the right side end portions of the protruding members 44.

Moreover, an extended portion RS2 is connected without a seam to the sealing member RS on the reaction plane side of the inlet side communicating hole 39 for the fuel gas, and extends between the protruding members 44 on the cooling plane, reaching to the vicinity of the left side end portions of the protruding members 44.

Here, the spaces between the protruding members 44 where the extended portions RS1 and RS2 are provided mean the spaces between respective units of protruding members 44 formed in units as described above, and these portions are flat surfaces H where the press forming is not performed.

Here, a space for forming a connecting path 491 is ensured between the right side end portion of the extended portion RS1 and the sealing member RS arranged at a position facing this extended portion RS1. A space for forming a connecting path 492 is also ensured between the left side end portion of the extended portion RS2 and the sealing member RS arranged at a position facing this extended portion RS2.

As a result, on the cooling plane of the cathode side separator 35, there is formed a meandering coolant channel 50 with the extended portion RS2 and the extended portion RS1 being the boundary portion, and the two connecting paths 492 and 491 being the turning portion.

Figure 12:
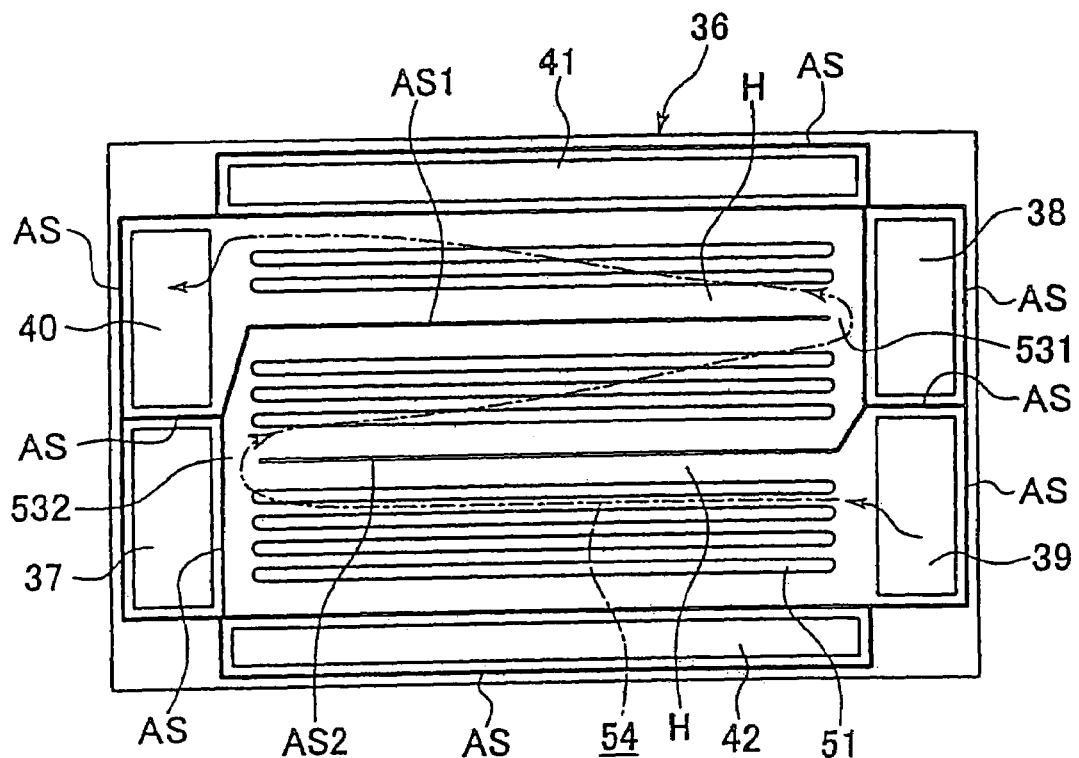
FIG. 12 is a plan view of an anode side separator in the second embodiment of the present invention.

FIG. 12 shows the anode side separator 36, which, similar to the cathode side separator 35 shown in FIG. 11, is press-formed from a metal material such as a stainless steel sheet material, and clamps the electrolyte membrane electrode assembly 7 at a position facing the cathode side separator 35.

In the anode side separator 36, there is formed each of the communicating holes constituting the internal manifold, corresponding to the cathode side separator 35.

More specifically, the lower communicating hole at the left side edge is constructed as an inlet side communicating hole 37 for the oxidant gas, and the upper communicating hole at the right side edge is constructed as an outlet side communicating hole 38 for the oxidant gas. On the other hand, the lower communicating hole at the right side edge is constructed as an inlet side communicating hole 39 for the fuel gas, and the upper communicating hole at the left side edge is constructed as an outlet side communicating hole 40 for the fuel gas. Moreover, the communicating hole at the upper side edge is formed as an outlet side communicating hole 41 for the coolant, and the communicating hole at the lower side edge is formed as an inlet side communicating hole 42 for the coolant. The portion surrounded by each communicating hole 37, 38 for the oxidant gas, each communicating hole 39, 40 for the fuel gas and each communicating hole 42, 41 for the coolant is constructed as a reaction plane.

On the reaction plane, corresponding to the cathode side separator plate 35, there are provided a plurality of grooves 51 extending linearly in the lateral direction in units of several grooves (four, three and two from the bottom) by press forming. The grooves 51 are concave portions of the portions formed in a corrugation, and on the backside of the anode side separator 36 shown in FIG. 13, these are formed as protruding members 52.

Both end portions of each groove 51 are arranged with a predetermined space from the side edge position of the reaction plane side of each communicating hole 37 and 38 for the oxidant gas and each communicating hole 39 and 40 for the fuel gas, Referring to FIG. 12, the peripheries of the communicating holes 37 and 38 and the communicating holes 41 and 42 for the coolant are surrounded by a sealing member AS, respectively.

Moreover, the inlet side communicating hole 39 and the outlet side communicating hole 40 for the fuel gas are also surrounded by the sealing member AS, with the exception of the side edge of the reaction plane side. That is to say, the inlet side communicating hole 39 and the outlet side communicating hole 40 for the fuel gas are communicated with the reaction plane.

A sealing member AS is provided between the inlet side communicating hole 37 for the oxidant gas and the outlet side communicating hole 40 for the fuel gas. This sealing member AS extends between the grooves 51 on the reaction plane without a seam, and has an extended portion AS1 reaching to the vicinity of the right side end portions of the grooves 51.

A sealing member AS is provided between the outlet side communicating hole 38 for the oxidant gas and the inlet side communicating hole 39 for the fuel gas, and this sealing member AS extends between the grooves 51 on the reaction plane without a seam, and has an extended portion AS2 reaching to the vicinity of the left side end portions of the grooves 51.

The extended portion AS1 is inclined upwards at the base end, and then extends in the horizontal direction, while the extended portion AS2 is inclined downwards at the base end and then extends in the horizontal direction. Moreover, the sealing member AS and the extended portions AS1 and AS2 are attached by injection, baking, bonding or the like.

Here, the spaces between the grooves 51 where the extended portions AS1 and AS2 are provided means the spaces between respective units of the grooves 51 formed in units as described above, and these portions are flat surfaces H where the press forming is not performed.

A space for forming a connecting path 531 is ensured between the right side end portion of the extended portion AS1 and the sealing member AS arranged at a position facing this extended portion AS1. Moreover, a space for forming a connecting path 532 is ensured between the left side end portion of the extended portion AS2 and the sealing member AS arranged at a position facing this extended portion AS2.

As a result, on the reaction plane of the anode side separator 36, there is formed a meandering reactant gas (fuel gas) channel 54 with the extended portions AS1 and AS2 being the boundary portions, and the connecting paths 532 and 531 being the turning portions.

Figure 13:
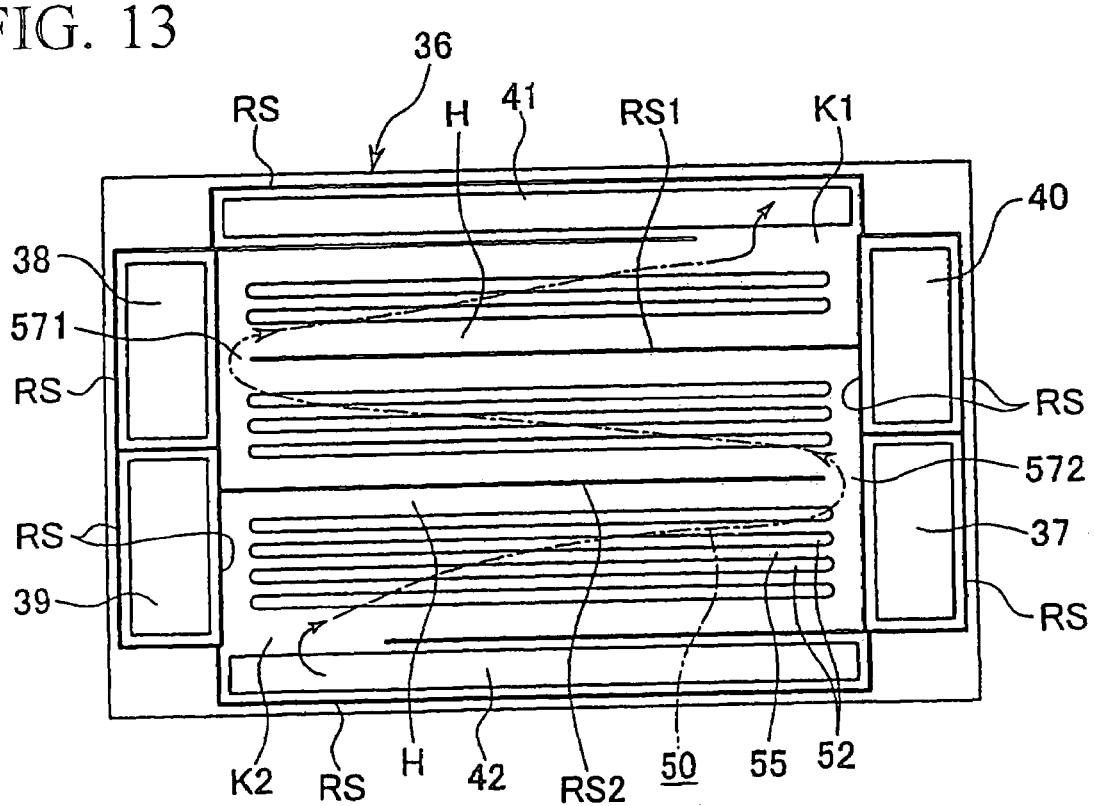
FIG. 13 is a back view of the anode side separator shown in FIG. 12.

On the other hand, FIG. 13 shows the anode side separator 36 in FIG. 12 as seen from the backside. Therefore, the right side edge in FIG. 13 corresponds to the left side edge in FIG. 12, and the left side edge in FIG. 13 corresponds to the right side edge in FIG. 12. Specifically, the outlet side communicating hole 38 for the oxidant gas and the inlet side communicating hole 39 for the fuel gas are respectively formed on the upper side and the lower side of the left side edge thereof. Also, the outlet side communicating hole 40 for the fuel gas and the inlet side communicating hole 37 for the oxidant gas are respectively formed on the upper side and the lower side of the right side edge thereof.

Moreover, the outlet side communicating hole 41 for the coolant is formed at the upper side edge of the anode side separator 36, and the inlet side communicating hole 42 for the coolant is formed at the lower side edge thereof, as in FIG. 12.

The portion surrounded by the respective communicating holes 37 and 38 for the oxidant gas, the respective communicating holes 39 and 40 for the fuel gas, and the respective communicating holes 41 and 42 for the coolant is constructed as a cooling plane to which the coolant is supplied.

On the cooling plane, there are formed protruding members 52 at positions corresponding to the grooves 51 described above referring to FIG. 12. Therefore, these protruding members 52 are formed in units of several ribs (four, three and two from the bottom), similarly to the grooves 51. Here, the protruding members 52 are convex portions of the portions formed in a corrugation. Therefore, grooves 55 are formed between adjacent protruding members 52.

The opposite ends of each protruding member 52 is arranged with a predetermined space from the side edge positions on the reaction plane of each communicating hole 37, 38 for the oxidant gas, and each communicating hole 39, 40 for the fuel gas.

Referring to FIG. 13, the peripheries of each communicating hole 37, 38 for the oxidant gas and each communicating hole 39,40 for the fuel gas are surrounded by a sealing member RS, respectively.

The periphery of the outlet side communicating hole 41 for the coolant is also surrounded by the sealing member RS, with the exception of the portion where a part of the cooling plane (the right side in FIG. 13) is excised as a notch portion K1. Moreover, the periphery of the inlet side communicating hole 42 for the coolant is surrounded by the sealing member RS, with the exception of the portion where a part of the cooling plane (the left side in FIG. 13) is excised as a notch portion K2.

That is to say, the inlet side communicating hole 42 for the coolant is communicated with the cooling plane in the notch portion K2, and the outlet side communicating hole 41 is communicated with the cooling plane in the notch portion K1.

An extended portion RS1 is connected without a seam to the sealing member RS on the reaction plane side of the outlet side communicating hole 40 for the fuel gas, and extends between the protruding members 52 on the cooling plane, reaching to the vicinity of the left side end portions of the protruding members 52.

Moreover, an extended portion RS2 is connected without a seam to the sealing member RS on the reaction plane side of the inlet side communicating hole 39 for the fuel gas, and extends between the protruding members 52 on the cooling plane, reaching to the vicinity of the right side end portions of the protruding members 52.

Here, the spaces between the protruding members 52 where the extended portions RS1 and RS2 are provided mean the spaces between respective units of protruding members 52 formed in units as described above, and these portions are flat surfaces H where the press forming is not performed.

Here, a space for forming a connecting path 571 is ensured between the left side end portion of the extended portion RS1 and the sealing member RS arranged at a position facing this extended portion RS1. A space for forming a connecting path 572 is also ensured between the right side end portion of the extended portion RS2 and the sealing member RS arranged at a position facing this extended portion RS2.

As a result, on the cooling plane of the anode side separator 36, there is formed a meandering coolant channel 50 with the extended portion RS2 and the extended portion RS1 being the boundary portion, and the two connecting paths 572 and 571 being the turning portion.

In the above second embodiment, when the oxidant gas is supplied to the fuel cell (not shown), this oxidant gas is supplied from the inlet side communicating hole 37 for the oxidant gas in the cathode side separator 35 to the reaction plane of the cathode side separator 35, as shown in FIG. 10. Then, the oxidant gas flows into the meandering reactant gas channel 46 having the extended portion CS2 and the extended portion CS1 as the boundary portion and the connecting paths 452 and 451 as the turning portion, and the reacted gas is exhausted from the outlet side communicating hole 38 for the oxidant gas.

On the other hand, in a similar manner, when the fuel gas is supplied to the fuel cell, this fuel gas is supplied, as shown in FIG. 12, from the inlet side communicating hole 39 for the fuel gas in the anode side separator 36 to the reaction plane of the anode side separator 36. Then, the fuel gas flows into the meandering reactant gas channel 54 having the extended portion AS2 and the extended portion AS1 as the boundary portion and the connecting paths 532 and 531 as the turning portion, and the reacted gas is exhausted from the outlet side communicating hole 40 for the fuel gas.

As a result, by the supplied fuel gas and oxidant gas, electric energy is generated between the cathode side separator 35 and the anode side separator 36 via the solid polymer electrolyte membrane, to thereby generate power.

Furthermore, when the coolant is supplied to the fuel cell, this coolant is supplied, as shown in FIG. 11 and FIG. 13, from the inlet side communicating hole 42 for the coolant in the cathode side separator 35 and the anode side separator 36 to the cooling plane of each separator 35, 36. Then, the coolant flows into the meandering coolant channel 50 having the extended portions RS2 and RS1 as the boundary portion and the connecting paths 572 and 452 and the connecting paths 571 and 451 as the turning portion, and is exhausted from the outlet side communicating hole 41 for the coolant. As a result, the fuel cell can be cooled.

Therefore, according to the second embodiment, as in the first embodiment, the meandering reactant gas channels 46 and 54 are easily formed in the separators 35 and 36, by effectively utilizing the extended portions CS1, CS2, AS1 and AS2 of the sealing members CS and AS. Hence, the grooves 43 and 51 having a simple shape need only be press-formed on each separator 35, 36, enabling simplification of the shape. Moreover, the separator surface where the extended portions CS1, CS2, AS1 and AS2 of the sealing members CS and AS are arranged is a flat surface H, and hence it is not necessary to perform press forming. As a result, the degree of freedom in designing the shape of the reactant gas channel is increased.

Furthermore, a part of the reactant gas channels 46 and 54 formed between the electrolyte membrane electrode assembly 7 and the respective separators 35 and 36 are formed seamlessly by the extended portions CS1, CS2, AS1 and AS2 of the sealing members CS and AS. Hence, there is no possibility of gas leakage from the junction portion.

As a result, the reactant gas channel can be easily arranged without performing strict dimensional control.

Similarly, a part of the coolant channel 50 can be easily formed between the respective separators 35 and 36, by effectively utilizing the extended portions RS1 and RS2 of the sealing members RS. Hence, grooves 43 and 51 having a simple shape need only be press-formed on each separator 35, 36, enabling simplification of the shape. Moreover, the separator surface where the extended portions RS1 and RS2 of the sealing members RS are arranged is a flat surface H, and hence it is not necessary to perform press forming. As a result, the degree of freedom in designing the shape of the reactant gas channel is increased. Furthermore, the extended portions RS1 and RS2 of the sealing members RS are formed seamlessly, and hence there is no possibility of gas leakage from the junction portion. As a result, the coolant gas channel can be easily arranged without performing strict dimensional control.

Moreover, in this embodiment, in both the cathode side separator 35 and the anode side separator 36, the number of grooves 43 and 51 (four, three, two) reaching from the inlet side communicating holes 37 and 39 to the outlet side communicating holes 38 and 40 gradually decreases, and hence, the flow rate of each reactant gas can be increased, thereby enabling effective exhaust of the generated water. In order to increase the flow rate of the reactant gas, it is necessary to decrease the number of grooves on the outlet side, taking into consideration the portion decreased by using the reactant gas for the reaction.

According to this embodiment, since the number of communicating holes formed at the left side edge and the right side edge need only be two, the height dimension can be suppressed to make this compact. Hence this is advantageous in the case where it is mounted in a vehicle.

Figure 14:
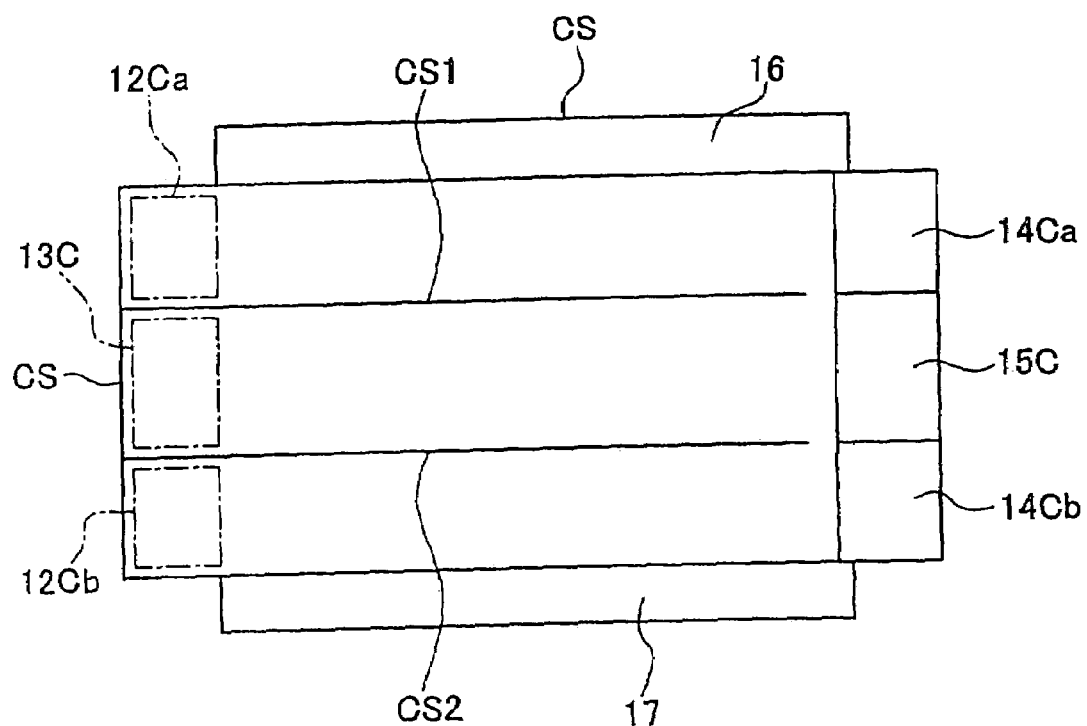
FIG. 14 is a plan view of a sealing member, being the main part in a third embodiment of the present invention.

A third embodiment will now be described with reference to FIG. 14. In this embodiment, the sealing members CS and RS in the above described embodiments are not mounted on each separator 10, 11, 35 and 36, but are provided as a separate body, so as to be clamped at necessary places at the time of assembly. FIG. 14 shows, as one example, a sealing member CS set on the reaction plane of the cathode side separator 10 in the first embodiment. This sealing member CS is provided with portions surrounding the peripheries of the inlet side communicating hole 17 and the outlet side communicating hole 16 for the coolant, the inlet side communicating holes 14C$a$ and 14C$b$ and the outlet side communicating hole 15C for the fuel gas, and the inlet side communicating holes 12C$a$ and 12C$b$ and the outlet side communicating hole 13C for the oxidant gas, and the reaction plane, and the above described extended portions CS1 and CS2.

If the sealing member CS in this third embodiment is used, the same effects as in the above described embodiments can be obtained, and by separately providing the sealing member CS in this manner, an operation such as injection, baking or bonding with respect to each separator is not necessary, thereby facilitating production of each separator. There is also merit in that a replacement operation for delicate parts is made possible at the time of maintenance.

This is also applicable to other sealing members (not shown), that is, the sealing members on the reaction plane of the anode side separator and the sealing members on the cooling plane of each separator.

A fourth embodiment will now be described with reference to FIG. 15. In the above described first and second embodiments, the sealing member is provided on each separator side for sealing between the membrane electrode assembly and each separator. In this embodiment however, the membrane electrode assembly is improved in order to mount the sealing member CS and the like on the electrolyte membrane electrode assembly 7.

Figure 15:
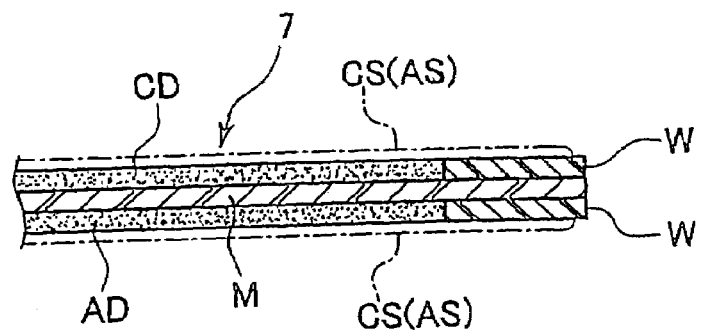
FIG. 15 is cross-section of a membrane electrode assembly, being the main part in a fourth embodiment of the present invention.

In FIG. 15, the electrolyte membrane electrode assembly 7 is constituted of a solid polymer electrolyte membrane M, and a cathode side separator CD and an anode side separator AD clamping the solid polymer electrolyte membrane M therebetween. However a stepped portion results between each electrode CD and AD at the periphery of the solid polymer electrolyte membrane M. In order to eliminate this stepped portion, in the electrolyte membrane electrode assembly 7 in this embodiment, a frame member W made of a resin or rubber in a shape of a picture frame is provided, and sealing members CS and AS are attached, spanning the frame member W and each electrode surface. By having such a construction, the stepped portion between the electrolyte membrane electrode assembly 7 and each separator is eliminated, and sealability of the sealing members CS and As in this portion can be improved. This embodiment is also applicable to the third embodiment.

A fifth embodiment will now be described with reference to FIG. 16 to FIG. 18.

The above described first to third embodiments are so-called internal manifold types, whereas this embodiment is applied to an external manifold type.

Figure 16:
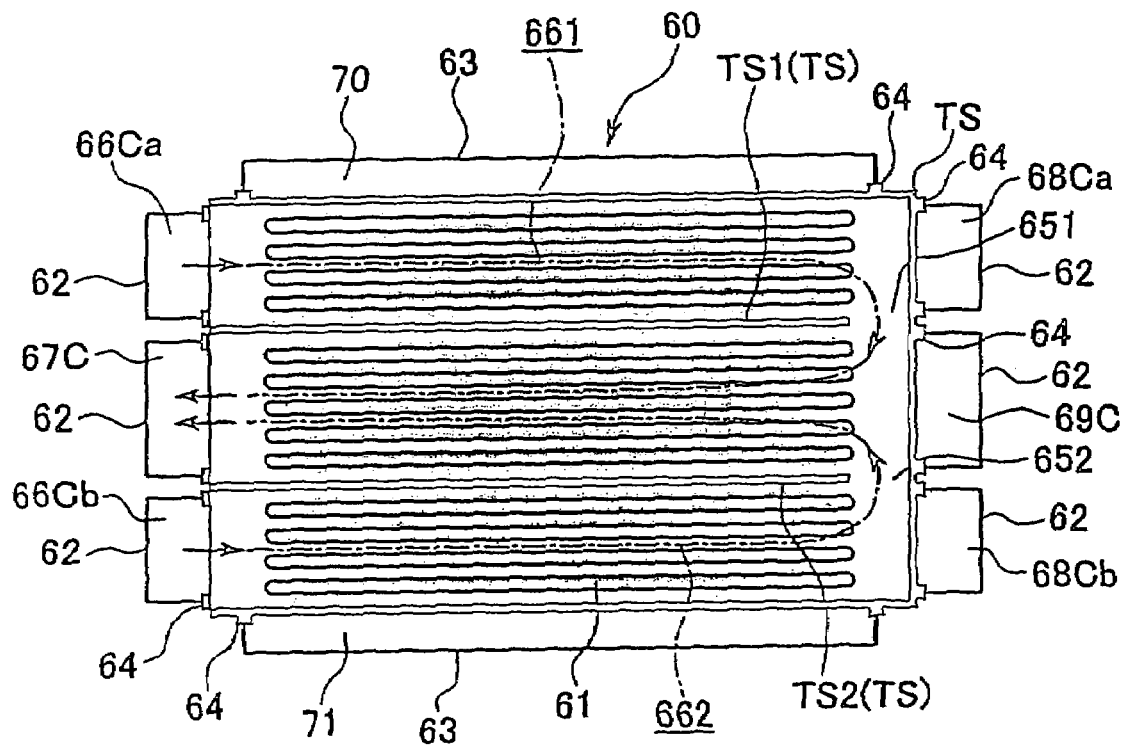
FIG. 16 is a plan view of a cathode side separator in a fifth embodiment of the present invention.

FIG. 16 shows a reaction plane of the cathode side separator 60, and corresponds to FIG. 1 in the first embodiment. The cathode side separator 60 is formed from a thin metal plate by press forming, and is provided with three units of grooves 61 extending in the lateral direction, with one unit being four, five and four from the top.

The cathode side separator 60 is provided with a sealing member TS at the edges of the upper side edge, the lower side edge and the right side edge, excluding the left side edge. From the left side edge of the cathode side separator 60, extended portions TS1 and TS2 of two sealing members TS extend up to just before the right side edge without a seam, at positions dividing each unit of the grooves 61. A connecting path 651 and a connecting path 652 are respectively formed between the right ends of the extended portions TS1 and TS2 and the sealing member TS.

Figure 17:
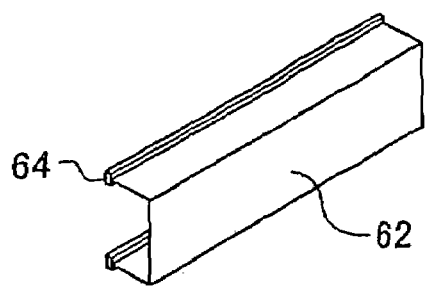
FIG. 17 is a perspective view of a manifold member of the fifth embodiment of the present invention.
Figure 18:
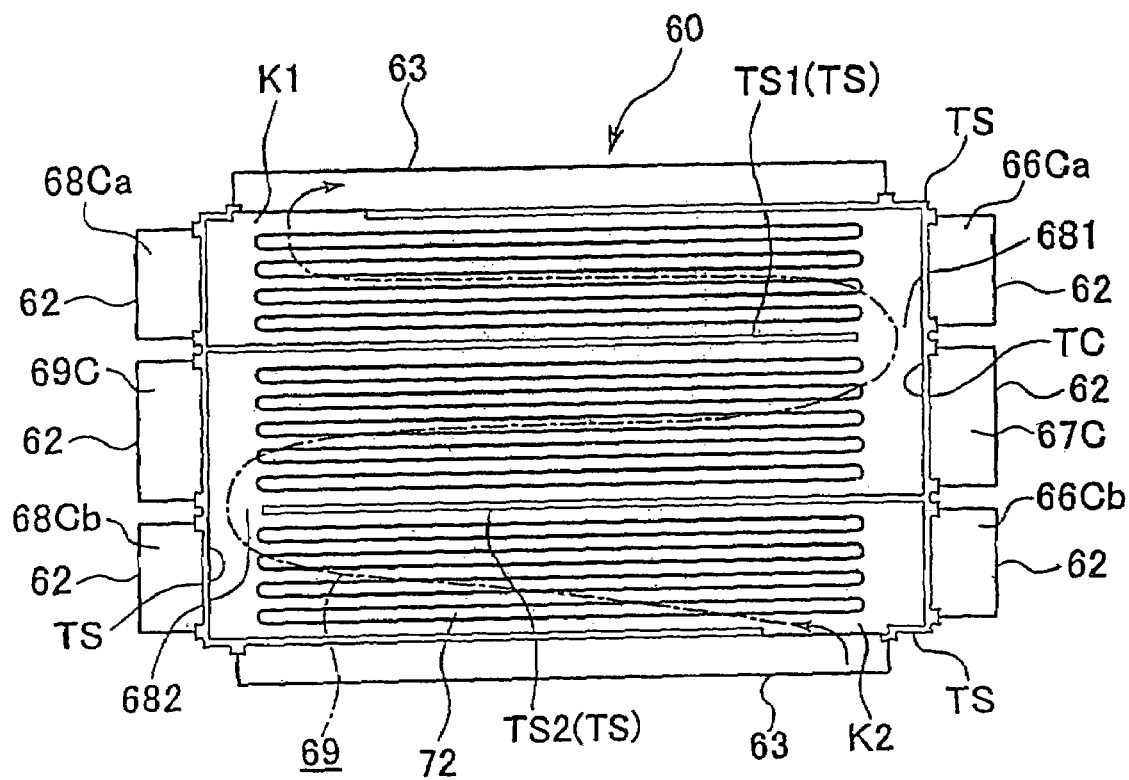
FIG. 18 is a back view of the cathode side separator shown in FIG. 16.
Figure 19:
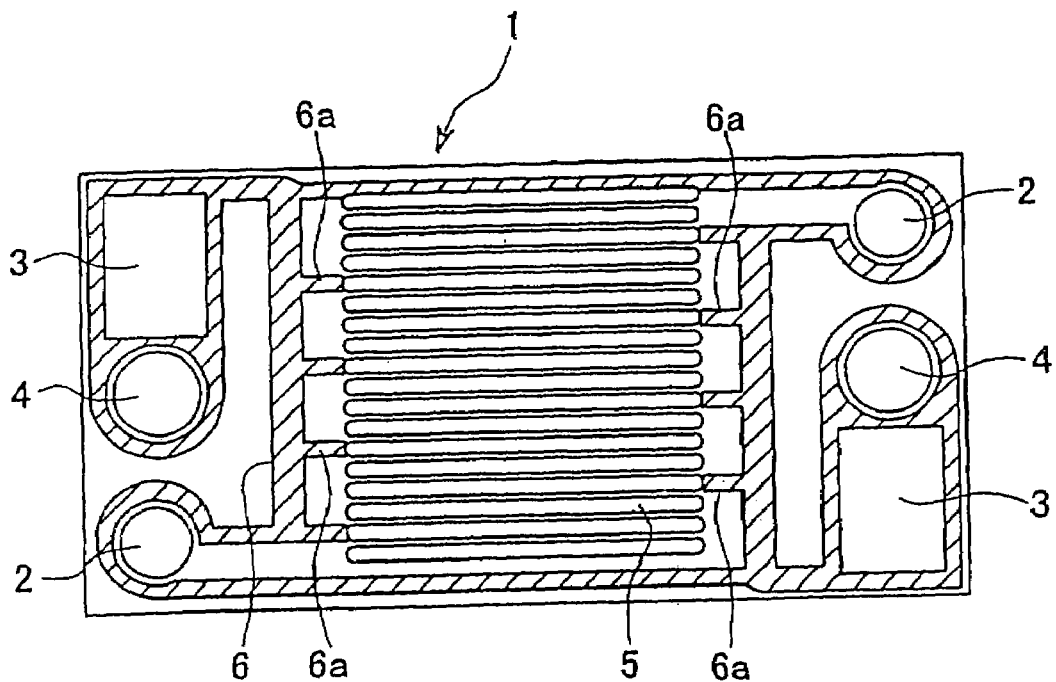
FIG. 19 is a plan view of the prior art.

At the left side edge of the cathode side separator 60, there are attached three manifold members 62 in a channel form as shown in FIG. 17 for the oxidant gas, at a position corresponding to each extended portion TS1. At the opposite right side edge, there are also attached three manifold members 62 having the same construction for the fuel gas. At the upper side edge and the lower side edge of the cathode side separator 60, a manifold member 63 for the coolant is attached one each, respectively. Each manifold member 62 and 63 is attached with a seal material 64 at the installation portion.

Therefore, the inlet side manifolds 66Ca and 66Cb for the oxidant gas are formed by the upper and lower manifold members 62 at the left side edge, and the outlet side manifold 67C for the oxidant gas is formed by the central manifold member 62. Moreover, the inlet side manifolds 68Ca and 68Cb for the fuel gas are formed by the upper and lower manifold members 62 at the right side edge, and the outlet side manifold 69C for the fuel gas is formed by the central manifold member 62. Furthermore, the inlet side manifold 71 for the coolant is formed by the manifold member 63 at the lower side edge, and the outlet side manifold 70 for the coolant is formed by the manifold member 62 at the upper side edge.

Accordingly, a U-shaped reactant gas (oxidant gas) channel 661 is formed by the extended portion TS1 of the sealing member TS on the reaction plane of the cathode side separator 60, with the extended portion TS1 being the boundary and the connecting path 651 being the turning point. Moreover, a U-shaped reactant gas channel 662 is formed by the extended portion TS2 of the sealing member TS on the reaction plane of the cathode side separator 60, with the extended portion TS2 being the boundary and the connecting path 652 being the turning point, FIG. 18 shows the cooling plane on the backside of the cathode side separator 60 in FIG. 17. On this plane, protruding members 72 are formed at the backside positions of the above described grooves 61. On this cooling plane, the sealing members TS are provided, with the exception of the left side of the upper side edge and the right side of the lower side edge being notches K1 and K2, respectively. An extended portion TS1 of the sealing member TS extends from a slightly upper side of the central portion on the left side edge of the cathode side separator 60 up to just before the right side edge without a seam, in a position dividing each unit of the protruding members 72. On the other hand, an extended portion TS2 of the sealing member TS extends from a slightly lower side of the central portion on the right side edge of the cathode side separator 60 up to just before the left side edge without a seam, in a position dividing each unit of the protruding members 72.

A connecting path 681 is formed between the right end portion of the extended portion TS1 and the sealing member TS. A connecting path 682 is also formed between the left end portion of the extended portion TS2 and the sealing member TS.

Then, as described above, three manifold members 62 in a channel form as shown in FIG. 17 are attached for the oxidant gas, at the left side edge, in a position corresponding to each extended portion TS1. Also at the right side edge on the opposite side, three manifold members 62 having a similar construction are attached for the fuel gas. A manifold member 63 is attached for the coolant, one each at the upper side edge and the lower side edge of the cathode side separator 60. A sealing member 64 is attached to each manifold member 62, 63 at the installation portion.

In this manner, a meandering coolant (ethylene glycol) channel 69 is formed on the cooling plane of the cathode side separator 60, with the extended portions TS2 and TS1 being the boundary portion, and the connecting paths 682 and 681 being the turning portion.

The description has been made herein only for the cathode side separator 60, but it is also applicable to the anode side separator. Also, the description has been made to a case corresponding to the first embodiment, but this external manifold structure is applicable also to the second embodiment.

Accordingly, also in this fifth embodiment, the same effects as in the first embodiment can be obtained by the external manifold type.

The present invention is not limited to the above described embodiments, and for example, the present invention is applicable to a molten carbon type fuel cell other than the solid polymer type fuel cell.

As described above, according to the first aspect of the invention, the reactant gas channel is formed easily by effectively utilizing the sealing member, and hence the shape of the reactant gas channel formed in the separator can be simplified. In addition, the portion where the sealing member forming a part of the reactant gas channel is arranged may be flat. Hence the degree of freedom in designing the shape of the reactant gas channel is increased. Moreover, since a part of the reactant gas channel is formed seamlessly by a part of the sealing member, there is no possibility of gas leakage from the junction portion.

According to the second aspect of the invention, it becomes possible to manufacture the separator by press forming, thereby improving productivity. Moreover, since the separator may be flat, the press formability is also improved.

According to the third aspect of the invention, since the turning portion can be formed by the sealing member, the shape of a groove or the like formed in the separator can be simplified as much as possible, and hence forming the separator is facilitated.

Having thus described several exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the invention is limited and defined only by the following claims and equivalents thereto.

What is claimed is:

1. A fuel cell, comprising:
a pair of separators, a first of said separators having a plurality of linear protruding members on a first surface thereof forming grooves between adjacent protruding members;
a membrane electrode assembly including an electrolyte membrane and an anode and a cathode disposed at both sides of said electrolyte membrane, said membrane electrode assembly being held by said pair of separators;
a sealing member disposed between said membrane electrode assembly and the first surface of the first of said pair of separators, said sealing member including a circumferential portion surrounding at least a portion of the circumference of the first separator, and an extended portion seamlessly connected to and extending from the circumferential portion through a first groove between a first protruding member and a second protruding member adjacent to the first protruding member to an end portion of the extended portion over the first surface of the first separator; and
a reactant gas channel disposed between said membrane electrode assembly and said first separator, wherein the gas channel bends around the end portion of the extended portion of the sealing member, said extended portion extending along a significant portion of said gas channel in order to direct the flow of a fluid flowing therealong.

2. A fuel cell according to claim 1, wherein said pair of separators is formed from a metal thin plate.

3. A fuel cell according to claim 1, wherein said reactant gas channel has a turning portion, and a boundary portion of said turning portion is constituted by at least a part of said sealing member.

4. A fuel cell according to claim 2, wherein said reactant gas channel has a turning portion, and a boundary portion of said turning portion is constituted by at least a part of said sealing member.

5. A fuel cell according to claim 1, wherein said reactant gas channel has a turning portion and a linear portion, and said sealing member extends to said linear portion.

6. A fuel cell according to claim 1, wherein the protruding members are provided in parallel with said extended portion so that a part of said reactant gas channel is formed between said extended portion and said protruding member.

7. A fuel cell according to claim 1, wherein said extended portion of said sealing member forms a boundary portion for directing flow of the fluid along a significant portion of the reactant gas channel.

8. A fuel cell according to claim 7, wherein said extended portion of said sealing member when extending along said reactant gas channel operates as a boundary portion in order to form a U-shaped gas channel for directing the fluid therealong.

9. A fuel cell according to claim 8, further comprising a plurality of extended portions to form a plurality of U-shaped gas channels.

10. A fuel cell according to claim 1, wherein said gas channel comprises a plurality of passage units spaced apart from each other and defined by the protruding members, wherein each of said plurality of passage units includes a plurality of protruding members.

11. A fuel cell according to claim 10, wherein said extended portion of said sealing member extends between a pair of said plurality of passage units.

12. A fuel cell according to claim 1, wherein said reactant gas channel comprises a plurality of grooves.

13. A fuel cell, comprising:
a pair of separators, a first of said separators having a plurality of linear protruding members on a first surface thereof forming grooves between adjacent protruding members;
a membrane electrode assembly including an electrolyte membrane and an anode and a cathode disposed at both sides of said electrolyte membrane, said membrane electrode assembly being held by said pair of separators;
a sealing member disposed between said membrane electrode assembly and the first surface of the first separator of said pair of separators, said sealing member including a circumferential portion surrounding a circumference of a first separator of said pair of separators and an extended portion extending seamlessly from said circumferential portion over a flat surface between a first protruding member and a second protruding member adjacent to the first protruding member in a longitudinal direction over the first surface of the separator to an end portion of the extended portion; and
a reactant gas channel disposed between said membrane electrode assembly and said first separator, wherein the gas channel bends around the end portion of the extended portion of the sealing member.

14. The fuel cell of claim 13, wherein the extended portion separates a first linear portion of the reactant gas channel from a second linear portion of the reactant gas channel.

15. The fuel cell of claim 14, wherein a connecting path for connecting the first linear portion and the second linear portion is formed between an end of the extended portion and the circumferential portion of the sealing member.

* * * * *